(12) United States Patent
Voois et al.

(10) Patent No.: US 6,404,776 B1
(45) Date of Patent: Jun. 11, 2002

(54) DATA PROCESSOR HAVING CONTROLLED SCALABLE INPUT DATA SOURCE AND METHOD THEREOF

(75) Inventors: Paul Augustin Voois; Barry Dean Andrews, both of Sunnyvale; Truman Joe, San Jose; Philip Stanley Bednarz, Sunnyvale, all of CA (US)

(73) Assignee: 8 × 8, Inc., Santa Clara, CA (US)

( * ) Notice: Subject to any disclaimer, the term of this patent is extended or adjusted under 35 U.S.C. 154(b) by 0 days.

(21) Appl. No.: 08/987,800

(22) Filed: Dec. 10, 1997

Related U.S. Application Data

(63) Continuation-in-part of application No. 08/815,966, filed on Mar. 13, 1997.

(51) Int. Cl.⁷ .............................. H04J 3/02; H04J 3/16; H04J 3/18
(52) U.S. Cl. ...................... 370/468; 370/538; 370/477; 709/217
(58) Field of Search ................................. 370/468, 470, 370/473, 477, 535–544, 465, 447; 709/217; 348/14, 17, 19; 345/302; 707/101–104

(56) References Cited

U.S. PATENT DOCUMENTS

| | | | | |
|---|---|---|---|---|
| 5,023,869 A | * | 6/1991 | Grover et al. ................. | 370/84 |
| 5,164,980 A | | 11/1992 | Bush et al. | |
| 5,347,305 A | | 9/1994 | Bush et al. | |
| 5,379,351 A | | 1/1995 | Fandrianto et al. | |
| 5,392,284 A | * | 2/1995 | Sugiyama .................... | 370/84 |
| 5,506,844 A | * | 4/1996 | Rao ............................ | 370/84 |
| 5,539,452 A | | 7/1996 | Bush et al. | |
| 5,594,813 A | | 1/1997 | Fandrianto et al. | |
| 5,715,260 A | * | 2/1998 | Black et al. ................. | 714/798 |
| 5,870,087 A | * | 2/1999 | Chau ........................... | 345/302 |
| 5,889,549 A | * | 3/1999 | Yasuda et al. ............... | 348/14 |
| 5,973,685 A | * | 10/1999 | Schaffa et al. .............. | 345/328 |
| 6,028,586 A | * | 2/2000 | Swan et al. .................. | 345/132 |
| 6,034,971 A | * | 3/2000 | Love et al. .................. | 370/468 |
| 6,044,396 A | * | 3/2000 | Adams ........................ | 709/217 |
| 6,167,766 B1 | * | 1/2001 | Dunn et al. ................. | 73/863.01 |
| 6,181,711 B1 | * | 1/2001 | Zhang et al. ................ | 370/468 |

OTHER PUBLICATIONS

International Telecommunication Union (ITU–T) Telecommunication Standardization Sector of ITU, "Line Transmission on Non–Telephone Signals/Multiplexing Protocol for Low Bitrate Multimedia Communication" Recommendation for H.223, pp. 1–30, prepared by ITU–T Study Group 15 (1993–1996).

Wiegand, Thomas et al., "Rate–Distortion Optimized Mode Selection for Very Low Bit Rate Video Coding and the Emerging H.263 Standard", pp. 1–21, Jul. 20, 1995.

"Improving Image Quality with Intelligent Quantizer Regulation", pp. 84, 86, Electronic Design/Jul. 10, 1995.

(List continued on next page.)

*Primary Examiner*—Hassan Kizou
*Assistant Examiner*—Hanh Nguyen
(74) *Attorney, Agent, or Firm*—Crawford PLLC

(57) ABSTRACT

A multimedia communication arrangement processes and multiplexes different types of data, including data from an adaptive data rate data source and a nonadaptive data rate data source, to substantially increase data throughput over a communication channel. The rate at which data is collected from the adaptive data rate data source varies based on the available channel bandwidth of the modem. The transmission rate is optionally adjusted in response to a detected error rate. Furthermore, the amount of filtering performed by a video camera on an image before the image is encoded by a codec can be adjusted. In addition, a data recovery terminal optionally selectively adjusts intervals at which received audio data is sampled to potentially reduce latency periods.

60 Claims, 14 Drawing Sheets

OTHER PUBLICATIONS

Chen, Cheng–Tie et al., "A Self–Governing Rate Buffer Control Strategy for Pseudoconstant Bit Rate Video Coding", IEEE Transactions on Image Processing, pp. 50–59, vol. 2, No. 1, Jan. 1993.

"Improvement of SIM3 Buffer Regulation", ITU Rapporteur for Very Low Bitrate Visual Telephony, Document LBC–93–107, pp. 1–6, Middletown, Dec. 1993.

Viscito, Eric et al., "A Video Compression Algorithm with Adaptive Bit Allocation and Quantization", SPIE, vol. 65, Visual Communications and Image Processing '91: Visual Communication, pp. 58–72, 1991.

International Telecommunication Union (ITU–T) Telecommunication Standardization Sector of ITU, "Line Transmission on Non–Telephone Signals/Terminal for Low Bitrate Multimedia Communication/Draft ITU–T Recommendation H.324", pp. 1–33, prepared by ITU–T Study Group 15 (Nov. 11, 1995).

International Telecommunication Union (ITU–T) Telecommunication Standardization Sector of ITU, "General Aspects of Digital Transmission Systems/Dual Rate Speech Coder for Multimedia Communications Transmitting at 5.3 and 6.3 kbit/s/ITU–T Recommendation G.723.1", pp. 1–27, prepared by ITU–T Study Group 15 (1993–1996).

Zdepski, Joel et al., "Statistically Based Buffer Control Policies for Constant Rate Transmission of Compressed Digital Video", IEEE Transactions on Communications, pp. 947–957, vol. 39, No. 6, Jun. 1991.

International Telecommunication Union (ITU–T) Telecommunication Standardization Sector of ITU, "Narrow–band Visual Telephone Systems and Terminal Equipment/ITU–T Recommendation H.320", pp. 1–19, prepared by ITU–T Study Group 15 (1993–1996).

International Telecommunication Union (ITU–T) Telecommunication Standardization Sector of ITU, "Visual Telephone Systems and Equipment for Local Area Networks Which Provide a Non–Guaranteed Quality of Service/Draft ITU–T Recommendation H.323", pp. 1–75, prepared by ITU–T Study Group 15 (May 28, 1996).

International Telecommunication Union (ITU–T) Telecommunication Standardization Sector of ITU, "Line Transmission of Non–Telephone Signals/Control Protocol for Multimedia Communication/Recommendation H.245—Version 2", pp. 1–223, prepared by ITU–T Study Group 15 (1993–1996).

International Telecommunication Union (ITU–T) Telecommunication Standardization Sector of ITU, "Transmission of Non–Telephone Signals/Video Coding for Low Bit Rate Communication/Recommendation H.263—Version 2", pp. 1–152, prepared by ITU–T Study Group 16 (1997–2000).

* cited by examiner

DATA PROCESSOR HAVING CONTROLLED SCALABLE INPUT DATA SOURCE AND METHOD THEREOF

RELATED APPLICATION

This is a continuation-in-part of Ser. No. 08/815,966, filed Mar. 13, 1997.

FIELD OF THE INVENTION

The present invention relates generally to data processing arrangements and, more particularly, to the processing of scalable data in a multimedia system where more than one data source transmits over a common communication channel.

BACKGROUND OF THE INVENTION

The widespread use of digital processing technology has found its way into a variety of equipment and, in some form, into most industries. In many applications involving communication of different types of information, data processing arrangements have been configured to multiplex information from each type of information source over various communication-media types and arrangements.

In a typical multimedia application, for example, one type of data processing arrangement permits several data sources to transmit data over the same communication channel. In this environment, a multiplexing arrangement is typically used to process certain types of data from each of the several data sources and to present this processed data to the communication channel transmission equipment in an orderly fashion. The multiplexing arrangement receives an input from each data source and, through a single output port, provides the data to the communication channel according to a preestablished multiplexing protocol.

A problem arises, however, when attempting to efficiently use such a shared communication channel. The various data sources at the input side of the multiplexer provide data at varying rates based on the particular applications served by the data sources. The data transmission equipment, at the other side of the multiplexer, typically includes a specific maximum data transmission bandwidth that permits the transmission of data up to a certain upper limit. If the preestablished multiplexing protocol effects data collection from each of the data sources according to a specified rate, the multiplexer often fails to process enough data from some data sources. Moreover, the multiplexer often fails to process any data from other data sources. Such data processing failures render approaches of this type unacceptable for many data processing applications.

One approach to dealing with this problem involves using a relatively large stack data register arrangement, such as a first-in-first-out (FIFO) memory circuit, at each of the inputs to the multiplexer and at the output of the multiplexer. Using this arrangement, the multiplexer can draw data from each of the FIFOs at the input side and provide valid data to the FIFO at the output such that the output FIFO always contains data ready for transmission. The data transmission equipment will virtually always be filling its channel bandwidth by constantly drawing valid data from the output FIFO. One drawback of this method is that each FIFO introduces a delay in processing the data from the input source through to the transmission channel.

Another approach to this problem involves implementing one of the input data sources, such as a video encoder, using an internal mechanism that scales its output data rate by adjusting the amount of distortion in the encoded video signal. In approaches of this type, the multiplexer typically attempts to track the available bandwidth according to the amount of data in the output buffer of the video encoder. With the multiplexer drawing data from the FIFO of the video encoder according to available channel bandwidth, the video encoder decreases its data rate when the output buffer level rises and increases its data rate when the output buffer level drops. This approach, however, requires that the video encoder maintain a nominal or quiescent buffer level, thereby introducing undesired and often unacceptable delay. Another drawback to this approach is that the video encoder lacks direct access to the data rates of the other data sources, which together with the characteristics of the transmission determine the available channel bandwidth. Thus, the video encoder has to wait for changes in the data rates of the other data sources to affect the video encoder output buffer level. This delay reduces the speed at which the video encoder can adapt to these changes. Moreover, this approach often results in sudden changes in the output data rate of the video encoder. Sudden changes of this type can cause sudden changes in coding distortion, which adversely affect the perceived video quality.

Accordingly, a need exists for an improved data processing arrangement and method thereof for efficiently transmitting data in a manner that overcomes the above-mentioned shortcomings.

SUMMARY OF THE INVENTION

According to a system implementation of the present invention, a multimedia communication arrangement includes an image collecting terminal, a modem, and a data recovery terminal. Video and other signal types are processed by the image collecting terminal for transmission through a modem over a communication channel to a data recovery terminal. The system includes a first data source including a video image processor constructed to capture images and to present the images as a first type of data at a rate that varies in response to an available bandwidth factor for the communication channel. At least one additional data source generates at least one additional data signal. A data signal processing circuit is configured and arranged to collect the first type of data from the first data source at a rate that varies in response to an available channel bandwidth of the modem, to collect at least one additional type of data from the at least one additional data source at at least one established rate, and to adjust a transmission rate of the modem in response to a detected error rate.

According to another embodiment of the present invention, a multimedia communication system can be used to transfer video and other signal types from an image collecting terminal to a modem for transmission over a communication channel to a data recovery terminal. A first data source including a video image processor captures images from a video camera and presents them as a first type of data at a rate that varies in response to an available bandwidth factor for the communication channel. At least one additional data source generates at least one additional data signal. A data signal processing circuit is configured and arranged to collect the first type of data from the first data source at a rate that varies in response to an available channel bandwidth of the modem, to collect at least one additional type of data from the at least one additional data source at at least one established rate, and to adjust an amount of filtering performed by the video camera.

Another aspect of the present invention is directed to a multimedia communication terminal, comprising a first data source that includes a video image processor. The video image processor is constructed to capture images from a video camera and to present the images as a first type of data at a rate that varies in response to an available bandwidth factor for the communication channel. A second data source generating audio data. A data signal processing circuit is configured and arranged to collect the first type of data from the first data source at a rate that varies in response to an available channel bandwidth of the modem, to collect the audio data, and to delay delivery of the audio data to the modem.

Yet another aspect of the present invention is directed to a method for formatting multiple types of data, including data representing images, for transmission over a communication channel using a modem. Captured images are presented as a first type of data at a rate that varies in response to an available bandwidth factor for the communication channel. At least one additional data signal is generated. The first type of data is collected at a rate that varies in response to an available channel bandwidth of the modem. The at least one additional data signal is collected at at least one established rate. A multiplexing arrangement is configured and arranged to detect an error rate. A transmission rate of the modem is adjusted in response to the detected error rate.

According to still another embodiment of the present invention, formatting of multiple types of data for transmission over a communication channel using a modem is accomplished by presenting images captured using a video camera as a first type of data at a rate that varies in response to an available bandwidth factor for the communication channel. At least one additional data signal is generated. The first type of data is collected at a rate that varies in response to an available channel bandwidth of the modem. The at least one additional data signal is collected at at least one established rate. An amount of filtering performed by the video camera is adjusted.

Yet another embodiment of the present invention is directed to a method for formatting multiple types of data for transmission over a communication channel using a modem. The method includes presenting images captured using a video camera as a first type of data at a rate that varies in response to an available bandwidth factor for the communication channel. An audio data signal is generated. The first type of data is collected at a rate that varies in response to an available channel bandwidth of the modem. The audio data is also collected. Delivery of the audio data to the modem is delayed.

The method embodiments described above can also be implemented using systems. The above summary of the invention is not intended to describe each disclosed embodiment of the present invention. The figures and the detailed description will exemplify other aspects.

BRIEF DESCRIPTION OF THE DRAWINGS

Other aspects and advantages of the present invention will become apparent upon reading the following detailed description and upon reference to the drawings in which.

Figure 1:
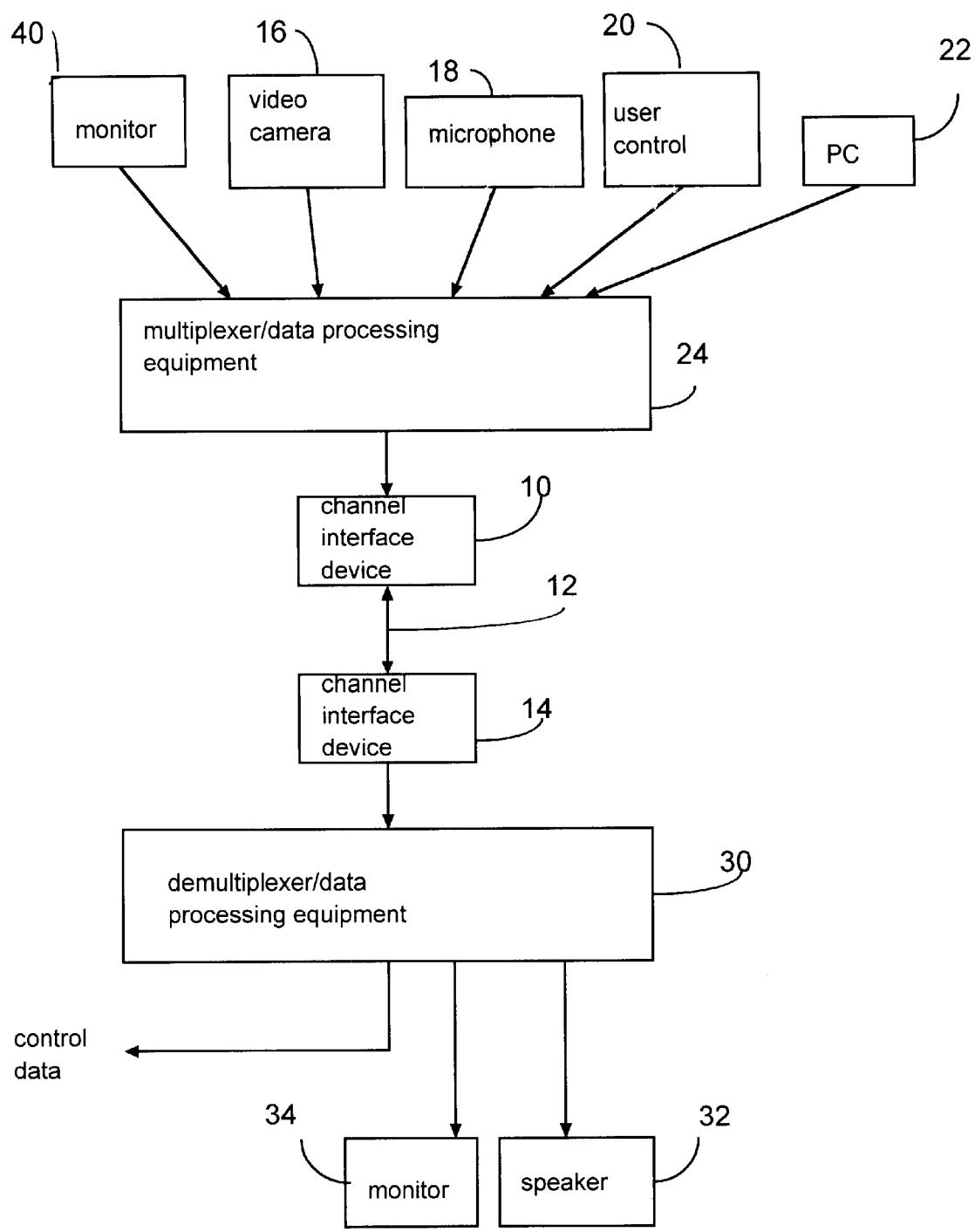
FIG. 1 is a block diagram of a videoconferencing system, according to a particular application of the present invention.

While the invention is susceptible to various modifications and alternative forms, specific embodiments thereof have been shown by way of example in the drawings and will herein be described in detail. It should be understood, however, that it is not intended to limit the invention to the particular forms disclosed. On the contrary, the intention is to cover all modifications, equivalents, and alternatives falling within the spirit and scope of the invention as defined by the appended claims.

DESCRIPTION OF THE VARIOUS EMBODIMENTS

The present invention may be generally applicable to various types of data processing environments in which video and at least one other input data source is processed for transmission using a common transmission channel. In applications requiring the processing of video data as one of various types of input data sources, the present invention is particularly advantageous for controlling the presentation of the data from the respective data sources to the communication channel according to its available data-accepting bandwidth. This available bandwidth is influenced by several factors, including, for example, the quality of the communication channel. A low-quality communication channel is susceptible to a relatively high error rate. In certain application environments providing error protection through retransmission of data, the retransmitted data consumes bandwidth that would otherwise be available for transmitting new data. A high-quality communication channel, on the other hand, is susceptible to fewer errors and involves retransmission of less data. As a result, more bandwidth is available for transmitting new data. The present invention provides, among other advantages, efficient handling of available bandwidth fluctuations attributable to variable data retransmission rates.

Turning now to the drawings, FIG. 1 illustrates a data processing system for a videoconferencing application. The system includes data sending equipment depicted above a communication channel 12 of FIG. 1 and data receiving equipment depicted below the communication channel 12. While the sending and receiving of such data is often reciprocal in many data processing applications of this type as with the instant videoconferencing illustration, the configuration illustrated in FIG. 1 is simplified in this regard to facilitate the discussion.

At the sending end of the system of FIG. 1, a transmitting channel interface device 10 is used to send processed data over the communication channel 12 to the receiving channel interface device 14. The data that is presented to the channel interface device 10 is collected from various types of data sources including, for example, a video camera 16, a microphone 18, a user control device 20, and a conventional personal computer 22. The data sources typically use buffers to store the data to be collected. The data collected from each of these data sources is received by multiplexer/data processing equipment (MDPE) 24. The MDPE 24 monitors the available channel bandwidth and, based on its capacity to transmit additional data, collects and formats the data collected from each of the input sources so as to maximize the amount of data to be transmitted over the channel 12. A monitor 40 is optionally used with the video camera 16 to monitor the manner in which video images are captured by the video camera 16.

At the lower end of the system of FIG. 1, the formatted data communicated over the channel 12 is received by the channel interface device 14, which then presents the received data to demultiplexer/data processing equipment (DDPE) 30. The DDPE 30 is set up to sort out the formatted data received over the channel 12 according to instructions previously sent by the MDPE 24. The demultiplexed data is then presented to the appropriate output source equipment, including audio data to a speaker 32, video data to a monitor 34, and control data to external equipment for subsequent processing.

Figure 2:
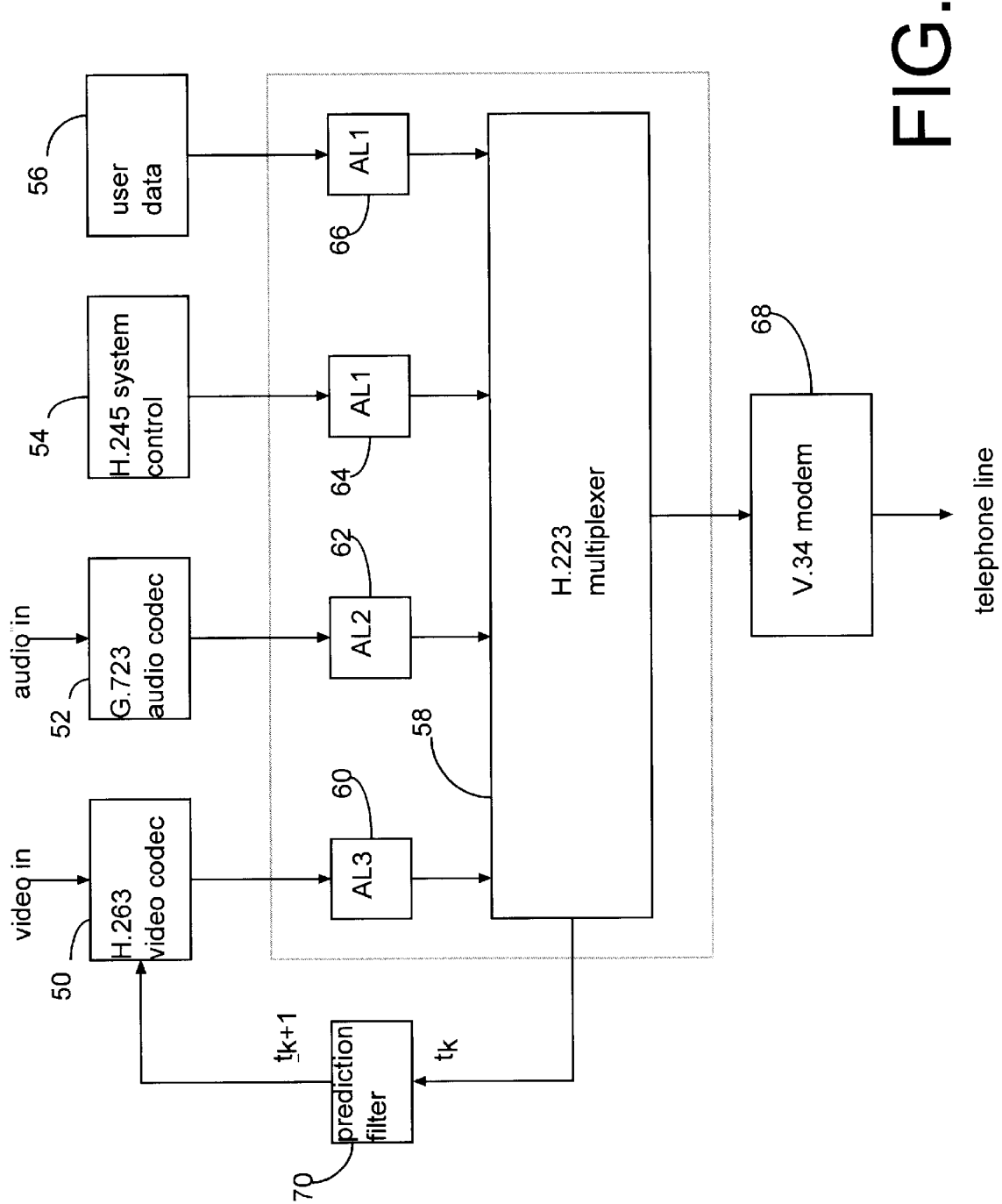
FIG. 2 is a block diagram of a multimedia terminal, as depicted in FIG. 1, constructed and operating according to one general embodiment of the present invention.

In FIG. 2, an example multimedia terminal implementing one embodiment of the present invention is illustrated. While the example multimedia terminal of FIG. 2 complies with the H.324 standard, it should be understood that the basic architecture is also suitable for use in connection with multimedia applications, such as applications complying with the H.320 and H.323 standards. The example multimedia terminal includes a conventional video coder/decoder (codec) 50 that encodes video input into data for transmission over a communication channel. In the illustrated application, the video codec 50 is constructed to comply with a video compression standard, such as the H.263 standard.

Video compression standards of this type are sometimes characterized by a certain amount of distortion, which the video codec 50 can vary to control its output data rate. For example, as the video codec 50 increases the amount of distortion involved in the encoding process, the compression ratio increases. With an increased compression ratio, the video codec 50 compresses images into relatively small data segments, at the expense of decreased image quality. Because image quality is sacrificed, the video codec 50 can be set to employ high-distortion encoding only in limited-bandwidth multimedia applications.

By contrast, when excess bandwidth is available, it is desirable to make efficient use of the available bandwidth. Accordingly, the video codec 50 encodes video data with relatively low distortion to improve image quality. Low-distortion encoding uses larger data segments to represent images, thus reducing the compression ratio. With a lower compression ratio, low-distortion encoding increases the output data rate of the video codec 50. Because excess bandwidth is available, however, the larger data segments can be transmitted over the communication channel 12.

The example multimedia terminal of FIG. 2 includes a number of additional data sources 52, 54, and 56. For example, an audio codec is typically used in encoding audio input as audio data according to an audio compression standard, such as the G.723 standard. Additional data sources may include, for example, a conventional personal computer for providing user data, such as text, and an H.245-compliant user control device for providing control data. Some H.245-compliant user control devices transmit data by encoding digits as combinations of audio tones according to, for example, a dual tone multifrequency (DTMF) technique. It should be noted, however, that other techniques may be used to transmit data without departing from the teaching of the present invention.

A multiplexer 58, described more fully below in connection with FIGS. 4–6, collects data from the data sources 50, 52, 54, and 56 and formats the collected data into a single data stream for transmission over the communication channel. The multiplexer 58 may be implemented using any of a variety of program-based devices, e.g., a circuit based on one or more of the following: a programmable digital signal processor (DSP) chip, a general purpose processor, a reduced instruction set computer (RISC) processor, and an application-specific integrated circuit (ASIC). An adaptive layer that includes a set of sublayers 60, 62, 64, and 66, typically processes the data from the data sources 50, 52, 54, and 56, respectively, before the multiplexer 58 collects the data. The adaptive layer facilitates interfacing between the different types of data sources 50, 52, 54, and 56 and the multiplexer 58.

Different types of sublayers providing various degrees of error control are used in transmitting data from different types of data sources. For example, FIG. 2 depicts the data sources 54 and 56 interfacing with the multiplexer 58 through one type of sublayer known in the industry as AL1 and the data source 52 as interfacing with the multiplexer 58 through another type of sublayer, known as AL2. AL2-type sublayers feature error detection and support data sources characterized by potentially variable data rates. Still another type of sublayer, known as AL3, is depicted as interfacing the video codec 50 with the multiplexer 58. AL3-type sublayers provide error detection for variable data rate data sources. In addition, sublayers of this type provide for error protection through built-in retransmission that is invisible to the video codec 50 and that affects the available channel bandwidth.

After collecting the data from the data sources 50, 52, 54, and 56, the multiplexer 58 formats the collected data for transmission over the communication channel. In order to communicate with multiple data sources over a single communication channel, the sending and receiving terminals agree on a set of predetermined packet formats known as multiplex table entries, which are stored in what is known as a multiplex table. These packet formats are typically designed to direct the multiplexer 58 to draw data from certain high-priority data sources first in constructing packets of data. For example, the format, "{L1,R10} {L0,R3}

{L2, R2} {L3, RX}" may indicate that a packet of data begins with ten bytes from the audio codec, which has the highest priority due to the importance of transmitting audio information during a conversation. The bytes from the audio codec are followed by three bytes from the user control device and two bytes from the personal computer. As specified by the notation, "RX," the rest of the data in the packet is drawn from the video codec 50, which has the lowest priority. In multimedia applications in which the video data channel has the lowest priority, the video codec 50 occupies the last position in each multiplex table entry and fills the rest of the packet of data. With the data from the video codec 50 filling the packet of data, the bandwidth available to the video codec 50 expands or contracts to fill the available channel bandwidth. Certain table entries in some applications may be specified by an applicable standard such as the H.324 standard. Each packet of data sent across the communication channel contains header information that indicates the format of the data in the packet. A demultiplexer at the receiving end of the communication channel distributes the data among devices at the receiving end according to the formatting information included in the header.

TABLE 1

| Entry | Priority | Descriptor |
|-------|----------|------------|
| 0 | 128 | {L0, Rx} |
| 1 | 37 | {L1, R25}{L0, Rx} |
| 2 | 32 | {L1, R21}{L0, Rx} |
| 3 | 53 | {L1, R25}{L3, Rx} |
| 4 | 48 | {L1, R21}{L3, Rx} |
| 5 | 64 | {L1, Rx} |
| 6 | 80 | {L0, R40}{L3, Rx} |
| 7 | 144 | {L3, Rx} |

Table 1 illustrates an example multiplex table including a set of eight multiplex table entries. It should be understood, however, that the multiplex table may contain a different number of entries. Each multiplex table entry can be described using one or more descriptors of the format, "{Lm,Rn}," where m denotes one of the data sources and n is either the number of bytes of data to be drawn from the denoted data source or the letter "X," which indicates that the multiplexer 58 is to fill the remainder of the data packet with data from the denoted data source. In the illustrated example, "L0" denotes a user control device buffer, "L1" denotes an audio codec, and "L3" denotes a video codec buffer. For example, entry 4 of the multiplex table illustrated in Table 1 directs the multiplexer 58 to draw 21 bytes of data from the audio codec buffer and to fill the rest of the data packet with data drawn from the video codec buffer.

According to one aspect of the present invention, the multiplex table entries are ranked in priority based on the data sources from which they direct the multiplexer 58 to draw data. The relative priority of each multiplex table entry may be indicated using a priority value, with a low priority value indicating a high priority. The priority value for each multiplex table entry is determined in part as a function of the priority of the data sources referenced and of the number of bytes of data drawn from each referenced data source. For example, entries 1 and 2 direct the multiplexer 58 to draw data first from the audio codec buffer and then from the user control device buffer in constructing a data packet. By comparison, entries 3 and 4 direct the multiplexer 58 to fill the remainder of the data packet using data drawn from the video codec buffer, which has a lower priority than the user control device buffer in this example. Entries 1 and 2 are accordingly assigned lower priority values, and therefore higher priorities, than entries 3 and 4.

As between entries 1 and 2, entry 1 directs the multiplexer 58 to draw 25 bytes from the audio codec buffer and the rest of the data packet from the user control device buffer. Entry 2, by comparison, directs the multiplexer 58 to draw 21 bytes from the audio codec buffer and the rest of the data packet from the user control device buffer. Assigning entry 2 a higher priority than entry 1 causes the multiplexer 58 to select entry 2 rather than entry 1, for example, when the audio codec buffer has 21 bytes of data available for transmission. Selecting entry 2 in this case allows the multiplexer 58 to draw four additional bytes of data (i.e., 25–21) from the user control device. The multiplexer 58 uses the available modem buffer space efficiently as a result.

The priority value for each multiplex table entry is also determined in part as a function of the number of data sources referenced. For example, entry 5 directs the multiplexer 58 to construct a data packet using only data drawn from the audio codec buffer. Although the audio codec has the highest priority in this example, it is often desirable to attempt to draw data from as many data sources as possible in constructing a data packet. Accordingly, entry 5 is assigned a lower priority, indicated by a greater priority value, than entries 1, 2, and 3. With the priority values being determined using these criteria, the multiplexer 58 makes efficient use of the available bandwidth by transmitting data from as many data sources as possible while servicing high-priority data sources first.

To construct a data packet for transmission, the multiplexer 58 selects a multiplex table entry for formatting the data packet. An H.223-compliant algorithm may be used in the selection process. It should be noted, however, that other selection algorithms may be used in some applications. If an H.223-compliant algorithm is used, the multiplex table entry for formatting the data packet is selected as a function of the buffer levels of the data sources. For example, if the audio codec buffer contains 25 bytes of data, the video codec buffer contains 200 bytes of data, and the user control device buffer is empty, the multiplexer 58 selects the highest-priority multiplex table entry that references the audio and video codecs, i.e., entry 3 of the multiplex table illustrated in Table 1. With entry 3 selected, the multiplexer 58 draws 25 bytes of data from the audio codec buffer and fills the remainder of the data packet with data drawn from the video codec buffer.

The amount of data drawn from the video codec buffer is determined as a function of the space available in the modem buffer. For example, for a typical 28.8 kbps modem transmitting 30 millisecond data frames, the available space is 864 bits, or 108 bytes. If 108 bytes are available in the modem buffer and the multiplexer 58 draws 25 bytes from the audio channel, the multiplexer 58 completes the data packet by drawing 83 bytes from the video channel. To increase the amount of video data transmitted, the audio channel can optionally be selectively disabled. Disabling the audio channel effectively mutes the videophone, but frees bandwidth for transmitting video data. This increase in available bandwidth can be used, for example, to improve the frame rate and/or the resolution of the transmitted images.

In the above example, if the audio channel instead contains 21 bytes of data and the user control channel contains 10 bytes of data, the multiplexer 58 selects the highest-priority multiplex table entry that directs the multiplexer 58 to draw 21 bytes of data from the audio codec buffer and that references the user control device. In this case, the multiplexer 58 selects entry 2. Accordingly, the multiplexer 58 constructs a 31-byte data packet using the 21 bytes of audio data and 10 bytes of user control data. If space remains in the modem buffer after the multiplexer 58 constructs the 31-byte data packet, the multiplexer 58 optionally constructs another data packet. For example, if 108 bytes are available in a 30 millisecond frame and the multiplexer 58 constructs the 31-byte data packet by drawing all of the data from the audio codec and user control device buffers, the multiplexer 58 may use the remaining 77 bytes in the frame to transmit video data. To transmit 77 bytes of video data, the multiplexer 58 selects entry 7 because the audio and user control channels contain no data. Next, the multiplexer 58 constructs a second data packet by drawing 77 bytes of data from the video channel. By constructing multiple data packets for transmission in a single frame when space permits, the multiplexer 58 uses the available bandwidth efficiently.

After formatting the collected data according to a multiplex table entry, the multiplexer 58 sends the formatted data to a modem 68. The modem 68 then transmits the data with the header over the communication channel to the receiving terminal. In addition, the multiplexer 58 provides an indication of the available bandwidth $t_k$ for the current update period to a prediction filter 70. From this indication of the available bandwidth, the prediction filter 70 computes a predicted available bandwidth $t_{k+1}$ for the next update period. The prediction filter 70 then provides the predicted available bandwidth $t_{k+1}$ to the video codec 50. In response to the predicted bandwidth $t_{k+1}$, the video codec 50 adjusts its internal rate control mechanism for the next update period to generate $t_{k+1}$ bytes. By using the prediction filter 70 to provide feedback to the video codec 50, the multimedia terminal realizes faster, smoother, and more accurate adaptation to changes in the available bandwidth compared to conventional techniques involving tracking the available bandwidth according to the buffer level of the video codec 50. Moreover, because adaptation is smoother, the video codec 50 avoids excessive coding distortion. As a result, perceived video quality is improved over conventional techniques.

The prediction filter 70 can be implemented using a variety of filters consistent with the present invention. In most application environments, a first order infinite impulse response (IIR) filter is suitable. A filter of this type is typically governed by an equation such as $$t_{k+1} = \alpha t_k + (1-\alpha) \hat{t}_k$$

where $\alpha$ is a constant whose value is selected as a function of the requirements of the system, $t_k$ is the predicted bandwidth for the current update period, calculated during the k-1$^{th}$ update period, and $\hat{t}_k$ is the actual bandwidth for the current update period. The value of $\alpha$ determines the speed at which the video codec 50 adjusts its data rate. As $\alpha$ increases, the video codec 50 realizes slower but smoother adaptation. For example, for a system in which the update period is 30 milliseconds, a value of $\alpha=0.86$ yields a satisfactory tradeoff between the adaptation speed and smoothness. Assuming $\alpha=0.86$, the video codec 50 adapts to a change in the available channel bandwidth in approximately 0.5 seconds. Other values of $\alpha$ may be used in other application environments in which different performance characteristics are desirable.

Figure 3:
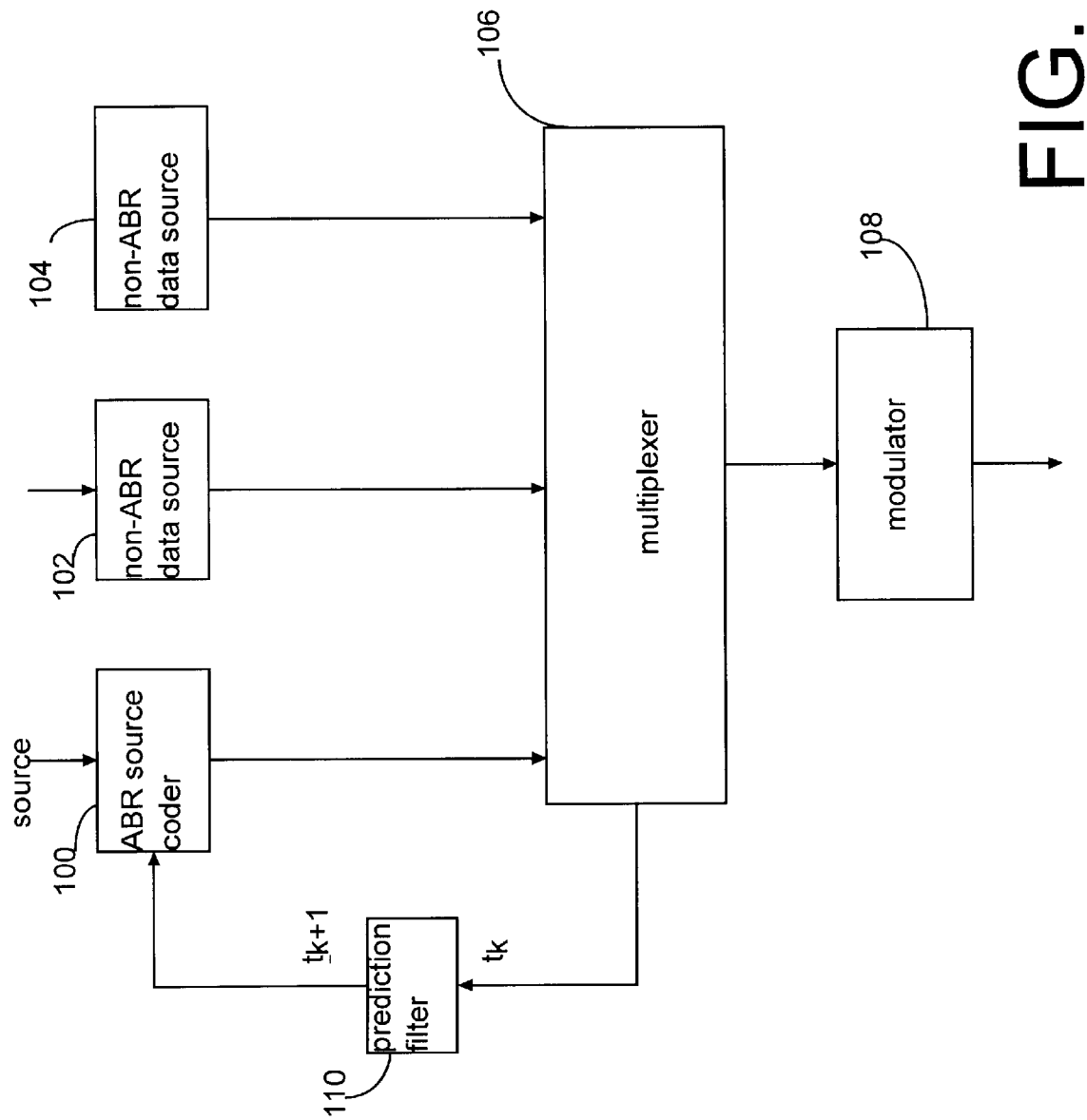
FIG. 3 is a block diagram of a data processing system, according to an embodiment of the present invention, for processing a plurality of input data sources for transmission over a common communication channel.

FIG. 3 illustrates, in block diagram form, a data processing system for processing a plurality of input data sources for transmission over a common communication channel. The system includes a set of logical channels, including an adaptive data rate (ABR) source coder 100 that encodes data at a data rate determined as a function of the available channel bandwidth. For example, when the available bandwidth is relatively small, the ABR source coder 100 encodes the data at a relatively low data rate. With a relatively low encoding data rate and thus a relatively low number of bytes to represent a data segment, the encoding resolution is limited. On the other hand, when excess bandwidth is available, the ABR source coder 100 uses a relatively high data rate. As a result, the encoding resolution and the data segment size increase. When a relatively large amount of bandwidth is available, however, the communication channel can transmit the larger data segments.

In addition, the set of logical channels also includes a number of non-adaptive data rate (non-ABR) data sources 102 and 104 that encode data at a data rate. The data rate may be variable, but that is independent of the available channel bandwidth. While FIG. 3 illustrates two non-ABR data sources 102 and 104, it should be understood that the system can be readily modified to include any number of non-ABR data sources consistent with the scope of the present invention.

A multiplexer 106 is configured and arranged to combine the data from the logical channels into a single data stream for transmission over a communication channel using a modulator 108. After collecting the data from the logical channels, the multiplexer 106 formats the collected data for transmission over the communication channel using a set of multiplex table entries as described above in connection with FIG. 2. The ABR source coder 100 occupies the last position in some multiplex table entries and fills the rest of the packet of data in application environments in which the ABR source coder 100 has the lowest priority of the logical channels. As a result, the bandwidth used by the ABR source coder 100 varies with the bandwidth availability. Each data packet contains a header that indicates which multiplex table entry is used. A demultiplexer at the receiving end of the communication channel distributes the data among the multiple devices according to the formatting information contained in the header.

The multiplexer 106 then sends the formatted data to a modulator 108, such as a modem, which transmits the data and the header over the communication channel to the receiving terminal. In addition, the multiplexer 106 indicates the available bandwidth for the current update period to a prediction filter 110, such as a first order IIR filter. From this indication of the available bandwidth, the prediction filter 110 predicts the available bandwidth for the next update period and provides the predicted bandwidth to the ABR source coder 100. The ABR source coder 100 then adjusts its encoding data rate for the next update period to fill the predicted available bandwidth. Because the available bandwidth is tracked using the prediction filter 110 rather than the output buffer of the ABR source coder 100, the ABR source coder 100 adapts quickly, accurately, and smoothly.

Figure 4:
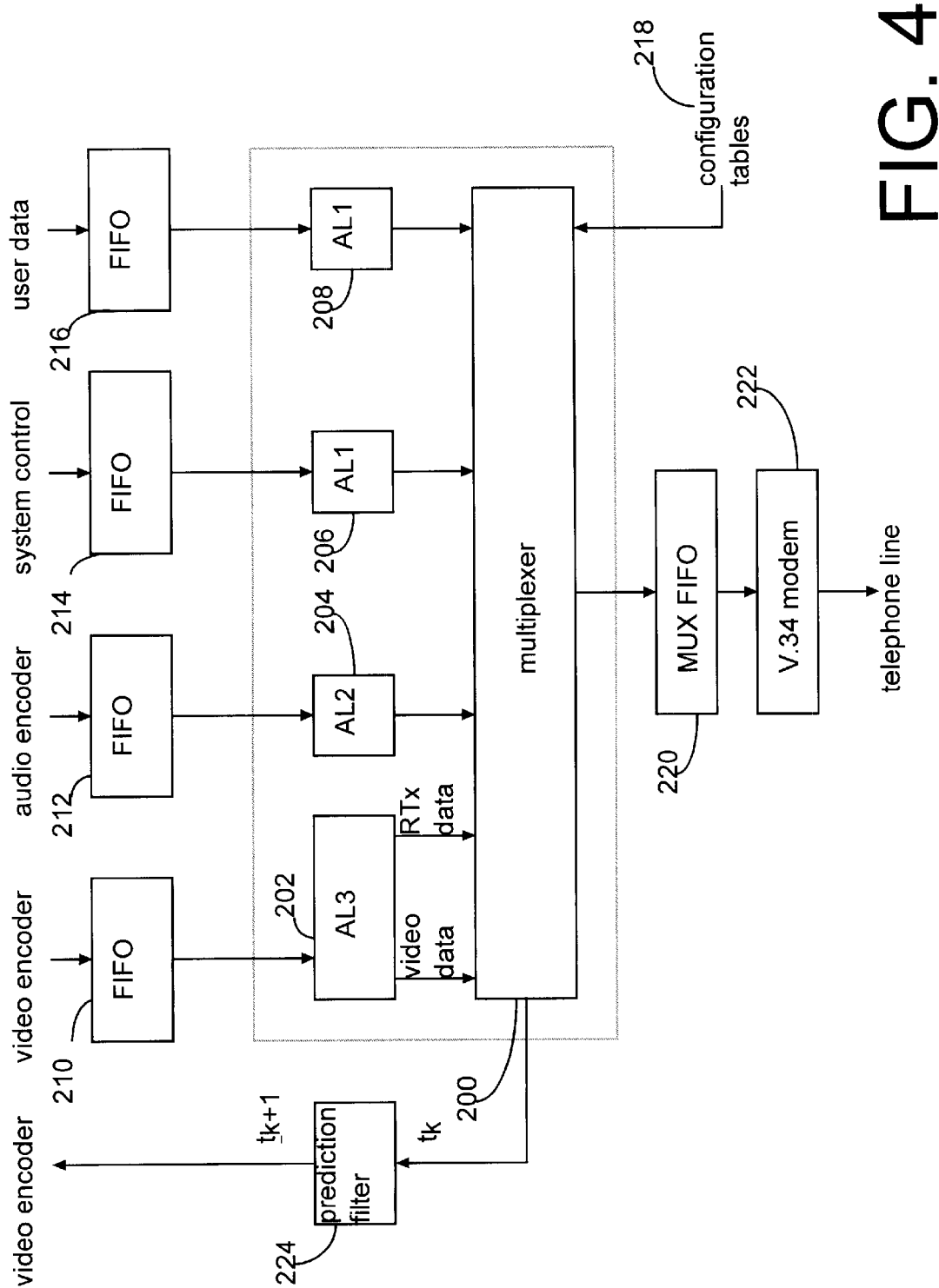
FIG. 4 is an exploded view of a portion of FIG. 2 including the multiplexer.

FIG. 4 illustrates in greater detail one example embodiment of the multiplexing layer of the multimedia terminal of FIG. 2. The multiplexing layer includes a multiplexer 200, which may be implemented using any of a variety of processors including, for example, a reduced instruction set computer (RISC) processor and software authored in the C programming language. The multiplexer 200 receives, through an adaptive layer that includes a set of sublayers 202, 204, 206, and 208, data from a set of memories 210, 212, 214, and 216. The memories 210, 212, 214, and 216 are depicted as being implemented using FIFO buffers that receive input from various logical channels or data sources, such as a video codec, an audio codec, a user control device, and a personal computer. For many application environments, the data sources are of different types. In such environments, different types of sublayers are used to interface the data sources with the multiplexer 200. For example, the sublayer 202 is illustrated as an AL3-type sublayer, which presents both video data and retransmitted data to the multiplexer 200.

Using a set of configuration tables 218 that contain multiplex table entries specified by a multiplexer standard, such as the H.223 standard, the multiplexer 200 formats the data collected from the various data sources for transmission. One example method for formatting the collected data is described more fully in connection with FIGS. 7A–7B. The multiplexer 200 then sends the formatted data to a memory 220, such as a FIFO buffer. A modem 222 draws the formatted data from the memory 220 and transmits the formatted data over a communication channel, such as a standard telephone line.

In the example embodiment of FIG. 4, the control mechanism is a discrete-time system having a state that is updated at preselected intervals. For example, in certain applications involving the transmission of audio information, the multiplexer 200 is activated when an audio packet is ready for transmission. Activating the multiplexer 200 when an audio packet becomes available ensures that the receiving terminal receives the audio packet before it exhausts the data from the previous audio packet, thus preventing gaps in the audio output at the receiving terminal. For example, according to the G.723 audio compression standard, each audio data packet contains 30 milliseconds of compressed audio data. The audio codec thus generates a packet, and the multiplexer 200 is activated in synchronization with this data packet transmission rate.

Control originates at the interface between the multiplexing layer and the modem 222. At the end of the $k^{th}$ update interval, the multiplexer 200 determines the bandwidth $t_k$ that was available to the video codec during that update interval. To determine the available bandwidth $t_k$, the multiplexer 200 determines the amount of video data transmitted during the $k^{th}$ update interval, excluding retransmitted data.

The multiplexer 200 then sends system messages indicating this amount and the amount of unused space in the modem buffer to a prediction filter 224, such as a first order IIR filter, which adds the two amounts to generate an indication of available bandwidth $t_k$. Based on the available bandwidth $t_k$ and the predicted available bandwidth $t_k$ for the $k^{th}$ update interval predicted during the k–1$^{th}$ update interval, the prediction filter 224 calculates a predicted available bandwidth $t_{k+1}$ for the k+1$^{th}$ update interval. The prediction filter 224 then provides the predicted available bandwidth $t_{k+1}$1 to the video codec, which adjusts its output data rate for the k+1$^{th}$ update interval accordingly. With feedback being obtained from the prediction filter 224, this adjustment is made more quickly, more accurately, and more smoothly than in conventional techniques in which the output buffer of the video codec provides the feedback.

Figure 5:
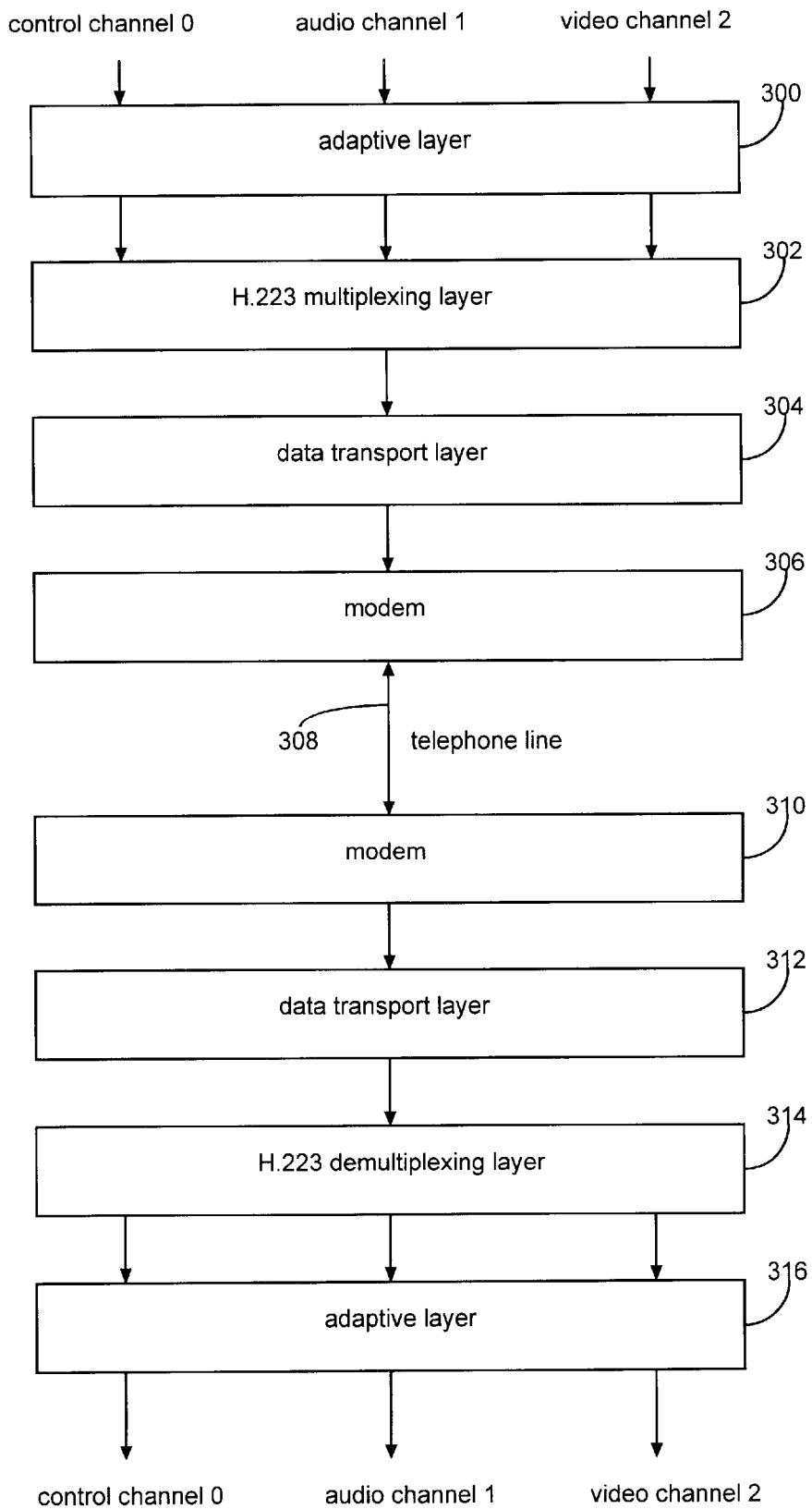
FIG. 5 is a diagram illustrating the layered processing structure of the data flow as is useful in implementing the system of FIG. 1.

FIG. 5 depicts a layered processing structure of the flow of data useful in implementing the system of FIG. 1 according to the present invention. In the structure illustrated in FIG. 5, data is received from three logical channels: a control channel, an audio channel, and a video channel. While three logical channels are depicted in FIG. 5, it should be understood that a different number of logical channels may be used. For example, the system of FIG. 1 uses four logical channels: video, audio, system control, and user data. An H.223-compliant adaptive layer 300 that includes a number of sublayers provides an interface between several logical channels and a multiplexing layer 302, which is also H.223-compliant. The adaptive layer 300 provides various degrees of error control for individual logical channels. For example, one or more of the sublayers may introduce additional data into the data streams provided by the logical channels to provide error detection or correction capabilities.

After receiving the data through the adaptive layer 300, the multiplexing layer 302 formats the data into a single data stream according to one of several predetermined data packet formats and attaches a header corresponding to the particular format used. These formats are specified, for example, by the H.223 standard. Alternatively, the multiplexing layer 302 may use different preselected data packet formats, as long as the receiving terminal can process the formats. To format the data, the multiplexing layer 302 uses a data block structure consisting of several fields to allow efficient handling of information. The data block structure can be described, for example, using the C programming language. The fields of the data block structure contain information about the data block. One field, for example, may indicate the length of the data block. Some fields use flags to indicate the presence of certain conditions. For example, some flags indicate the beginning and end of a data packet. The multiplexing layer 302 may use certain flags to determine the transmission rate of specific logical channels. The multiplexing layer 302 counts the bytes transmitted as it checks the status of a flag indicating whether a packet is to be reported to the modem as transmitted and clears the flag. By clearing this flag, the multiplexing layer 302 avoids double-counting retransmitted data.

Each data block structure contains a pointer to another data block structure, such that a number of data block structures can form a linked list. To build the linked list, the multiplexing layer 302 sends a system message requesting a list of data block structures to transmit. As the system message propagates through the various adaptive sublayers of the layered structure illustrated in FIG. 5 to the corresponding logical channel sources, the adaptive layer 300 connects data block structures to form a linked list. Using data block structures allows the adaptive layer 300 to manipulate the data packet structure by manipulating elements of the data block structures rather than the data itself.

Once data is transmitted, the multiplexing layer 302 acknowledges transmission by sending another message to the appropriate logical channel. It should be noted that the data block structures in the linked list may exist in different buffers. Each of these buffers may be managed by a different part of the system, as the data block structure contains a field that identifies the source of the data block structure.

The multiplexing layer 302 then sends the formatted data and the header to a data transport layer 304, which provides transmit buffers and performs any necessary data conditioning. The data transport layer 304 then outputs the data and the header for transmission by a modem 306 over a communication channel 308, such as a standard telephone line. The multiplexing layer 302 also provides feedback to the video channel (not shown) to allow the video channel to adjust its output rate according to the available channel bandwidth and thus make efficient use of the communication channel.

The receiving terminal receives the formatted data and the header using a modem 310. A data transport layer 312 that includes receiving buffers conditions the received data, if necessary, and provides the data and the header to an H.223-compliant demultiplexing layer 314. Using the header, the demultiplexing layer 314 distributes the received data among several logical channels using data block structures.

The demultiplexing layer 314 uses a circular buffer to store data block structures and the data that they contain. A logical channel sink, such as one of the logical channels depicted at the bottom of FIG. 5, manages the circular buffer. The demultiplexing layer 314 requests space in the circular buffer from the logical channel sink by sending a system message to the logical channel sink. The demultiplexing layer 314 then fills the space with data block structures. Each data block structure contains a field indicating the amount of space in the circular buffer used by the data block structure. After the logical channel sink has processed the data block structure, it can free the space in the circular buffer for storing new incoming data. Using the data block structure and the space indicator allows rapid manipulation of data in the circular buffer. Moreover, the circular buffer need not store the received data in a linear order. The space-indicating field is set such that the logical channel sink frees space in a linear order, even if the circular buffer stores the received data in another order due to, for example, retransmission protocols. The ability to store the received data in another order allows more efficient retransmission of data.

The adaptive layer 316 provides an interface between the demultiplexing layer 314 and various logical channels, such as a control channel, an audio channel, and a video channel. The adaptive layer 316 detects and removes any error control information inserted by the adaptive layer 300 and distributes the data among the logical channels. The data received by each logical channel is sent to an appropriate device, such as a display monitor. In this manner, the structure of FIG. 5 transmits information from various logical channels at the sending terminal over a single physical communication channel to the receiving terminal and to corresponding logical channels at the receiving terminal.

Figure 6:
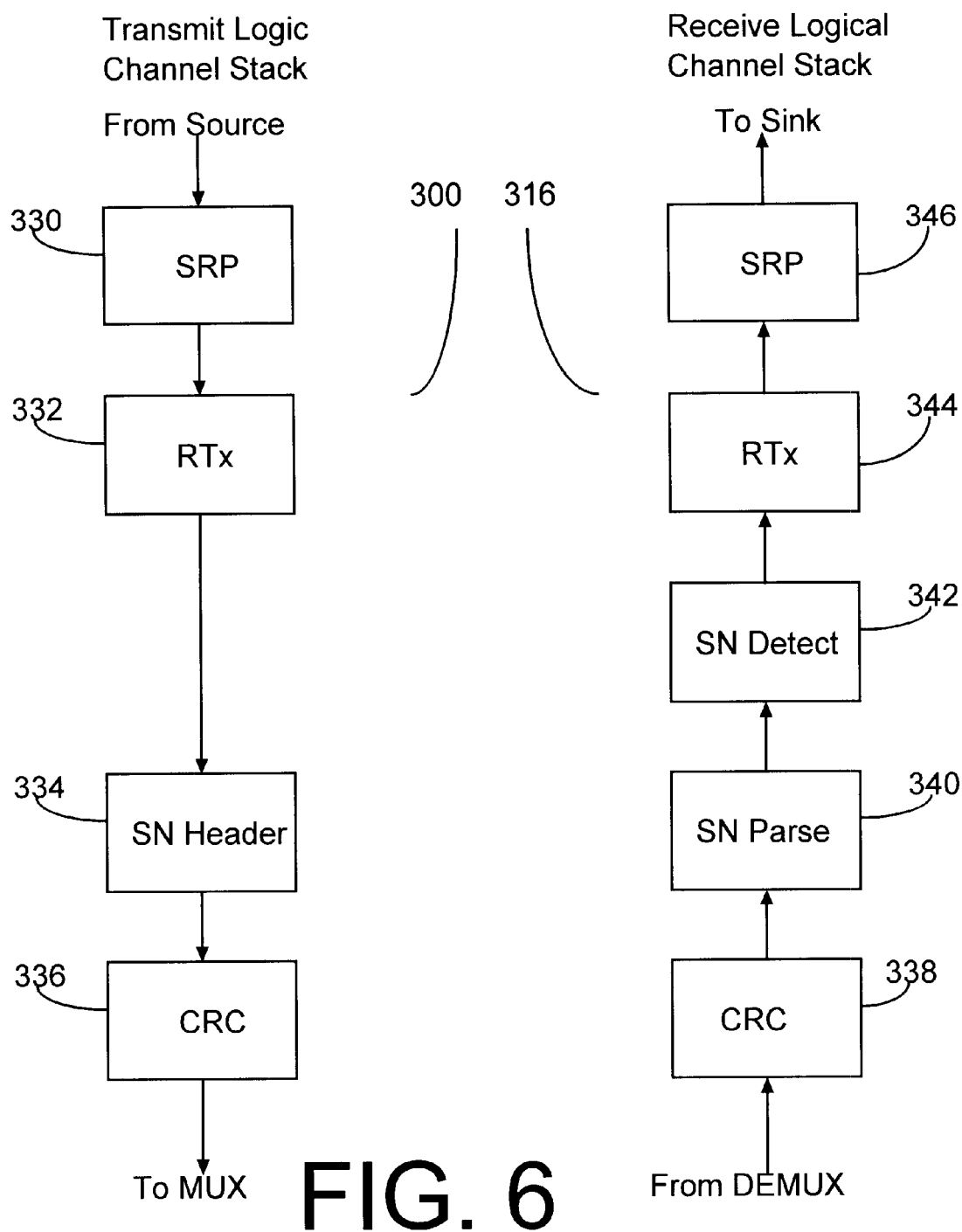
FIG. 6 is an exploded view of the adaptive layer portions of FIG. 5.

FIG. 6 illustrates in greater detail one example implementation of the adaptive layers 300 and 316 of FIG. 5. The adaptive layer 300 of FIG. 5 consists of several sublayers that provide specific error control functions. A sublayer 330 maintains a retransmission buffer of transmitted data and an acknowledgment timer for acknowledging transmission of data. The retransmission buffer is also maintained by a sublayer 332, which coordinates requests for retransmitted packets. Another sublayer 334 adds a sequence number header to each data packet. A sublayer 336 calculates and appends an eight or sixteen bit cyclic redundancy check (CRC) code to the end of each data packet by manipulating elements of the data block structure before sending the data packet to the multiplexer layer 302 of FIG. 5 for formatting. It should be noted that some adaptive sublayers used in connection with certain logical channels may be absent.

On the receiving side of the layered processing structure of FIG. 5, the adaptive layer 316 consists of sublayers that provide specific error control functions. As data is received from the demultiplexing layer 314 of FIG. 5, a sublayer 338 decodes the CRC code on each data packet and indicates whether the CRC has failed. The sublayer 338 also effectively removes the CRC code from the data packet by decrementing the length of the array storing the packet data. The logical channel sink therefore receives the packet without the CRC code. Because no data was actually removed from the circular buffer, the value stored in the space-indicating field remains unchanged.

A sublayer 340 extracts a sequence number header from each data packet, and another sublayer 342 inspects the sequence number headers to detect sequence numbering errors. The sublayer 342 also indicates the number of packets missing when a sequence error occurs. A sublayer 344 responds to sequence numbering errors by requesting retransmission of missing packets. The sublayer 344 manages delivery of packets to maintain the proper sequence order. A sublayer 346 requests acknowledgment of properly received packets from the demultiplexing layer 314 of FIG. 5. It should be noted that certain sublayers may be absent in some types of logical channels.

Communication between the layers illustrated in FIG. 5 and the sublayers illustrated in FIG. 6 is handled, for example, by a system messaging interface. Interfaces of this type provide a common interface between various layers and sublayers and allows complicated protocols to be reduced to simple operations. Moreover, new protocols can be developed subsequently and associated with logical channels without requiring modification of the multiplexing layer 302, the demultiplexing layer 314, or the adaptive layers 300 and 316. Instead, new protocols may use the same system messaging interface to communicate with these layers.

Figure 7A:
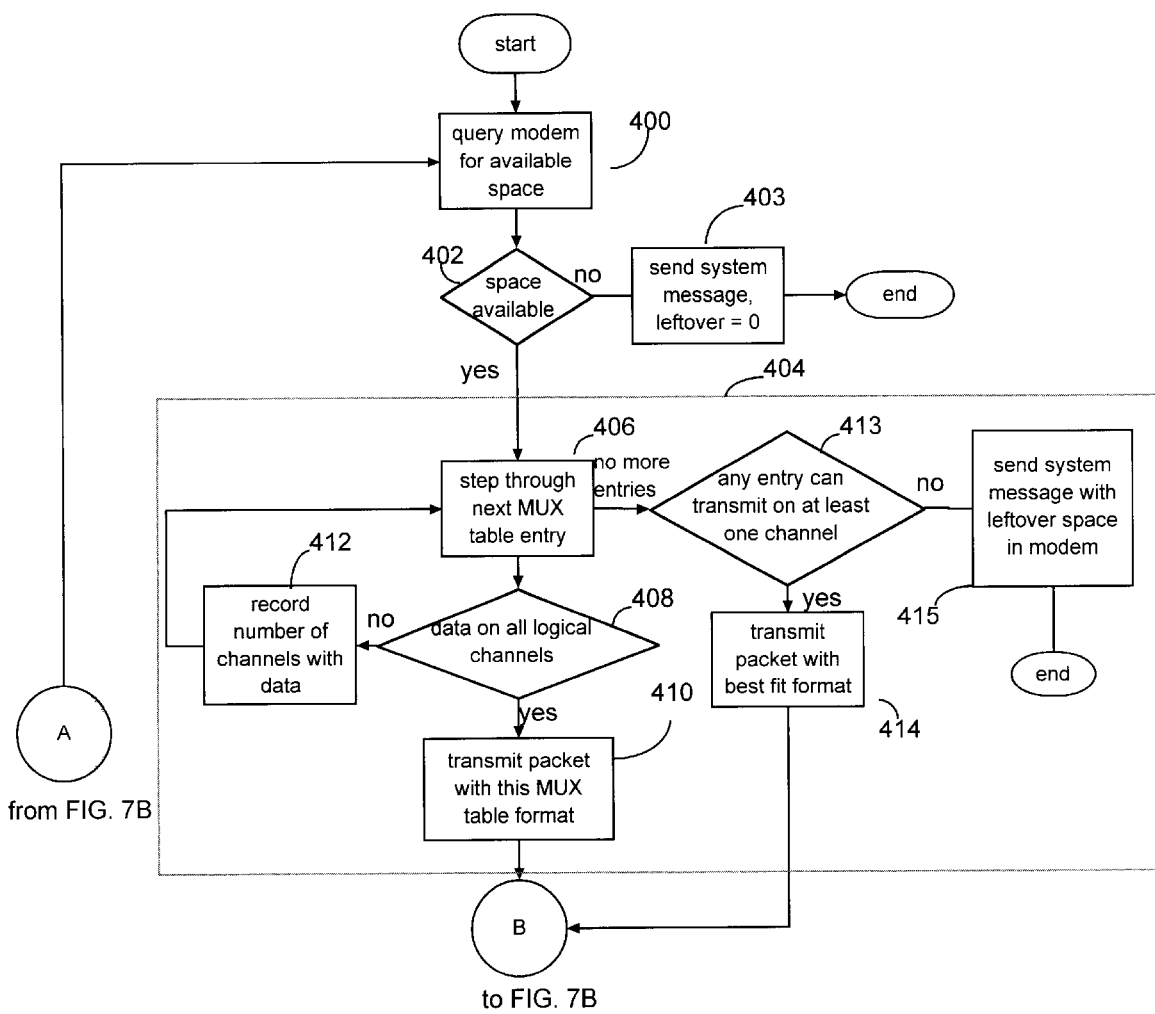
FIGS. 7A–7B comprise a flow chart illustrating one manner in which a microcomputer or data processor can be programmed to implement the operation depicted in connection with the terminal of FIG. 2, according to one of the illustrated embodiments of the present invention.
Figure 7B:
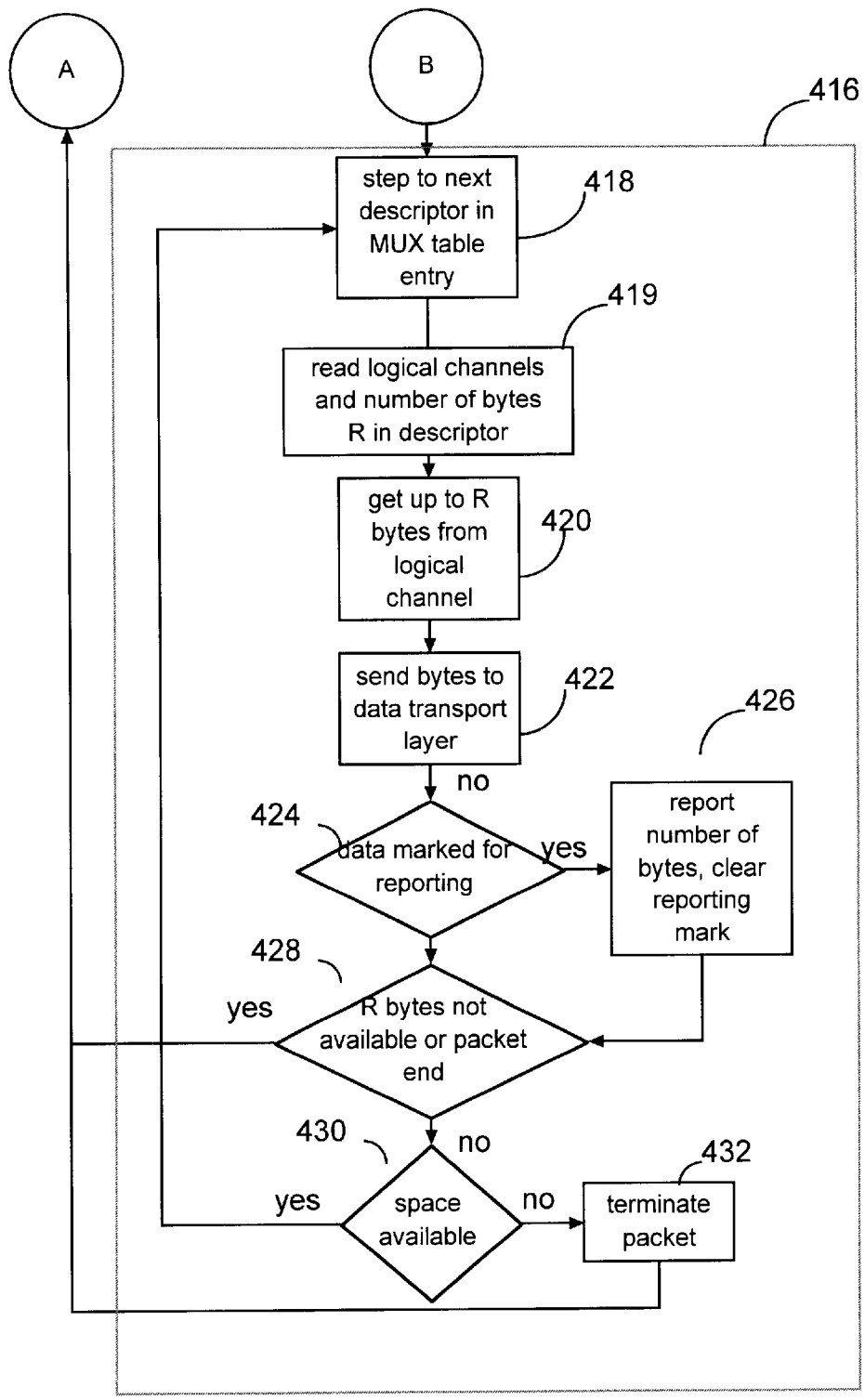

FIGS. 7A–7B illustrate one manner in which a microprocessor or data processor is programmed to implement the operation depicted in connection with the terminal of FIG. 2, according to one of the illustrated embodiments of the present invention. The microprocessor or data processor may be thus programmed, for example, using the C programming language. It should be understood, however, that the microprocessor or data processor can be programmed using a variety of programming languages without departing from the teaching of the present invention.

At a block 400, the multiplexing layer (302 of FIG. 5) queries the data transport layer 304 for the available space in the modem buffer, depicted as the memory 220 of FIG. 4. The data transport layer 304 attempts to maintain a constant modem buffer level equal to the sum of the average number of bytes that the modem (222 of FIG. 4) can transmit in an update interval of, for example, 30 milliseconds and a margin of error to allow for data rate fluctuations during the actual communication session. The average number of bytes that the modem can transmit may be determined with respect to a different update interval if, for example, the terminal uses a different audio compression standard specifying a different audio data packet size.

As depicted at a block 402, the microprocessor or data processor next determines whether the modem buffer has sufficient available space to store a data packet. Assuming the multiplexing layer 302 is H.223-compliant, the data packet contains one byte of header information and at least one byte of data. The minimum packet size for a H.223-compliant multiplexing layer is therefore two bytes, and the modem buffer must typically have two bytes available. If the modem buffer lacks sufficient available space, the multiplexing layer 302 sends a system message to a prediction filter indicating that insufficient space is available for storing a data packet, as depicted at a block 403. The process then ends. Otherwise, flow proceeds to a block 404, at which the multiplexing layer 302 generally selects a best-fit multiplex table entry for transmission in order to maximize the amount of data transmitted in each data packet. This best-fit analysis is based on the transmit priority of each multiplex table entry and on the number of logical channels referenced by each multiplex table entry having data available for transmission.

More particularly, as depicted at a block 406, the multiplexing layer 302 analyzes the multiplex table entries in descending order of transmit priority. Before the analysis begins, the user control device typically transmits the multiplex table to the remote terminal to confirm agreement on the packet formats. At a block 408, the microprocessor or data processor determines whether data is available on all of the logical channels referenced by the multiplex table entry of the current iteration, referred to as the current multiplex table entry. If all of the logical channels referenced by the current multiplex table entry have data available for transmission, the current multiplex table entry is the best-fit entry. Accordingly, the multiplexing layer 302 transmits the current multiplex table entry, as depicted at a block 410.

If, on the other hand, the current multiplex table entry references one or more logical channels that do not have data available for transmission, the number of logical channels having data available for transmission is recorded at a block 412. The multiplexing layer 302 counts this number from the first logical channel in the multiplex table entry descriptor until the multiplexing layer 302 finds a logical channel without data available for transmission. For example, if the first logical channel lacks data ready for transmission, the multiplexing layer 302 records a zero for the multiplex table entry, even if other logical channels have data ready for transmission.

After the multiplexing layer 302 records the number of logical channels having data ready for transmission, flow then returns to the block 406. The multiplexing layer 302 then analyzes the next multiplex table entry in a similar manner. This iterative process continues until the multiplexing layer 302 locates a multiplex table entry that only references logical channels having data available for transmission. If the multiplexing layer 302 locates such a multiplex table entry, the entry is transmitted at the block 410.

On the other hand, if the multiplexing layer 302 exhausts all of the multiplex table entries and fails to find such an entry, the multiplexing layer 302 determines whether any multiplex table entry can be used to transmit data from at least one logical channel, as depicted at a block 413. If so, the multiplexing layer 302 transmits the multiplex table entry that references the greatest number of logical channels having data available for transmission, as depicted at a block 414. If two or more multiplex table entries satisfy this condition, the multiplexing layer 302 selects the entry having the highest priority. If no multiplex table entry can be used to transmit data from any logical channel, flow proceeds instead to a block 415, at which the multiplexing layer 302 sends a system message indicating the amount of leftover space in the modem buffer.

After the multiplexing layer 302 determines the best-fit multiplex table entry in connection with the block 404, flow proceeds to a block 416, at which the multiplexing layer 302 generally constructs a data packet according to the format specified by the selected multiplex table entry. To construct the data packet, the multiplexing layer 302 first parses the multiplex table entry to obtain formatting information for a logical channel, as depicted at a block 418. At a block 419, the multiplexing layer 302 determines the logical channels referenced by the multiplex table entry and the amount of data to be transmitted from each referenced logical channel. As depicted at a block 420, the multiplexing layer 302 retrieves data from the logical channels referenced by the formatting information. After retrieving the data, the multiplexing layer 302 sends the data to the data transport layer 304, as depicted at a block 422.

At a block 424, the multiplexing layer 302 then determines whether the video codec has marked the data for reporting. Typically, the video codec marks data for reporting when it delivers the data to the adaptive layer 300. If the data is marked for reporting, the multiplexing layer 302 notifies the video codec when it transfers the data to the modem and reports the amount of data transferred. The multiplexing layer 302 then clears the reporting mark to avoid potential double-reporting associated with retransmission in connection with error recovery. This process is depicted at a block 426.

Regardless of whether the multiplexing layer 302 reports the data as transmitted, flow proceeds to a block 428. At this block, if the logical channel has less data available for transmission than specified by the formatting information or the end of a packet is reached, the multiplexing layer 302 terminates the packet. Flow then returns to the block 402 for preparation of a new packet. Otherwise, as depicted at a block 430, the multiplexing layer 302 continues to construct the packet as long as the modem buffer has available space by parsing additional formatting information from the multiplex table entry. This process continues until either no available space remains in the modem buffer, the end of a packet is reached, or no logical channel has data ready for transmission. Flow then proceeds to a block 432, at which the multiplexing layer 302 terminates the packet, and returns to the block 400.

To reduce the likelihood of errors involved in transmitting the data, the rate with which the modem transmits data is optionally adjusted in response to the error or corruption rate of the transmission. According to a particular embodiment of the present invention illustrated in FIG. 8, a multiplexer 800 draws data from a plurality of data sources, including, for example, a video codec 802 and an audio codec 804. The multiplexer 800 also detects the error rate involved in a transmission. The multiplexer 800 can detect the error rate using any of a variety of techniques. For example, a demultiplexer at the receiving terminal (not shown) can be configured to detect transmission errors by verifying checksums. When the demultiplexer determines that an error has occurred, it issues a request for retransmission of the data involved. The multiplexer 800 can be configured to track the rate at which the demultiplexer issues retransmission requests, thereby obtaining an indication of the error rate, or the remote video terminal can send a message via the control channel to indicate the error rate. The multiplexer 800 reports this error rate to a prediction filter 806, which is used in adjusting certain characteristics of the transmission by providing a control signal to, for example, a V.34-compatible modem 808. For example, the prediction filter 806 is optionally used to reduce the size of the video packets that arc transmitted and to adjust the transmission rate. Further, such a modem can renegotiate its transmission rate. By sending a lower rate, for example, the likelihood of error decreases.

Reducing the packet size lessens the likelihood of transmission error per packet. Each packet transmitted, however, imposes a certain amount of overhead on the communication channel, which can be measured in terms of the number of additional bytes involved in transmitting each packet. Accordingly, reducing the packet size can increase the total overhead involved in the transmission, thus reducing the bandwidth available on the communication channel. It is therefore desirable to transmit the largest packets that are appropriate for the transmission error rate to reduce overhead and conserve bandwidth. The prediction filter 806 also provides a control signal to a video codec 802, which adjusts the rate at which it encodes video data received from a video camera 810. The prediction filter also sets the maximum packet size the video codec can use.

Figure 8:
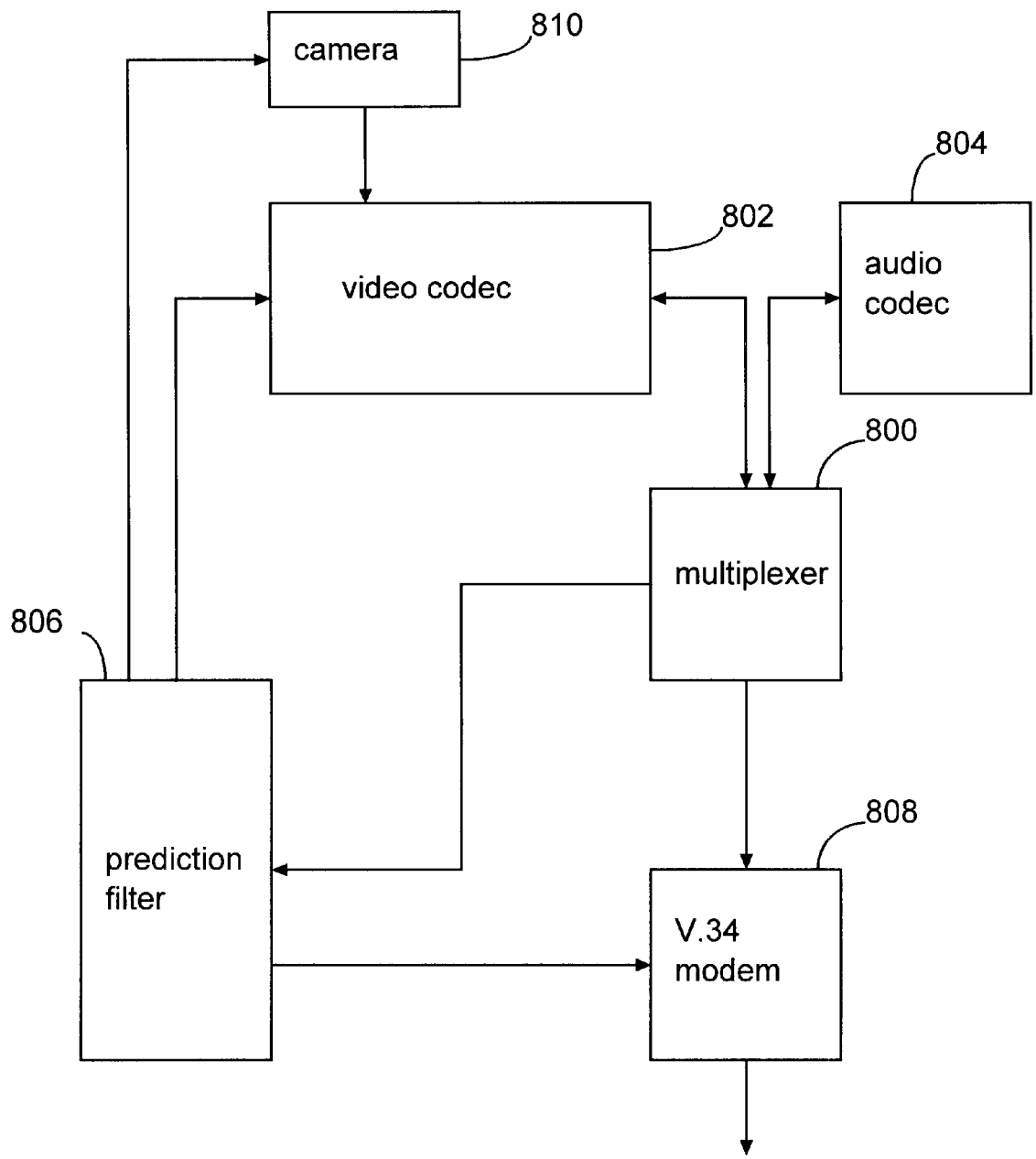
FIG. 8 is a block diagram of an example videoconferencing system, according to an embodiment of the present invention.

In another particular embodiment of the present invention, the prediction filter provides the feedback to the video camera 810 of FIG. 8, which in turn adjusts the amount of preprocessing that it performs on the video data before encoding by the video codec. For example, video cameras filter pixels to, for example, adjust brightness and balance levels and reduce spectral noise. The amount of preprocessing is controlled using control inputs of the video camera.

Figure 9:
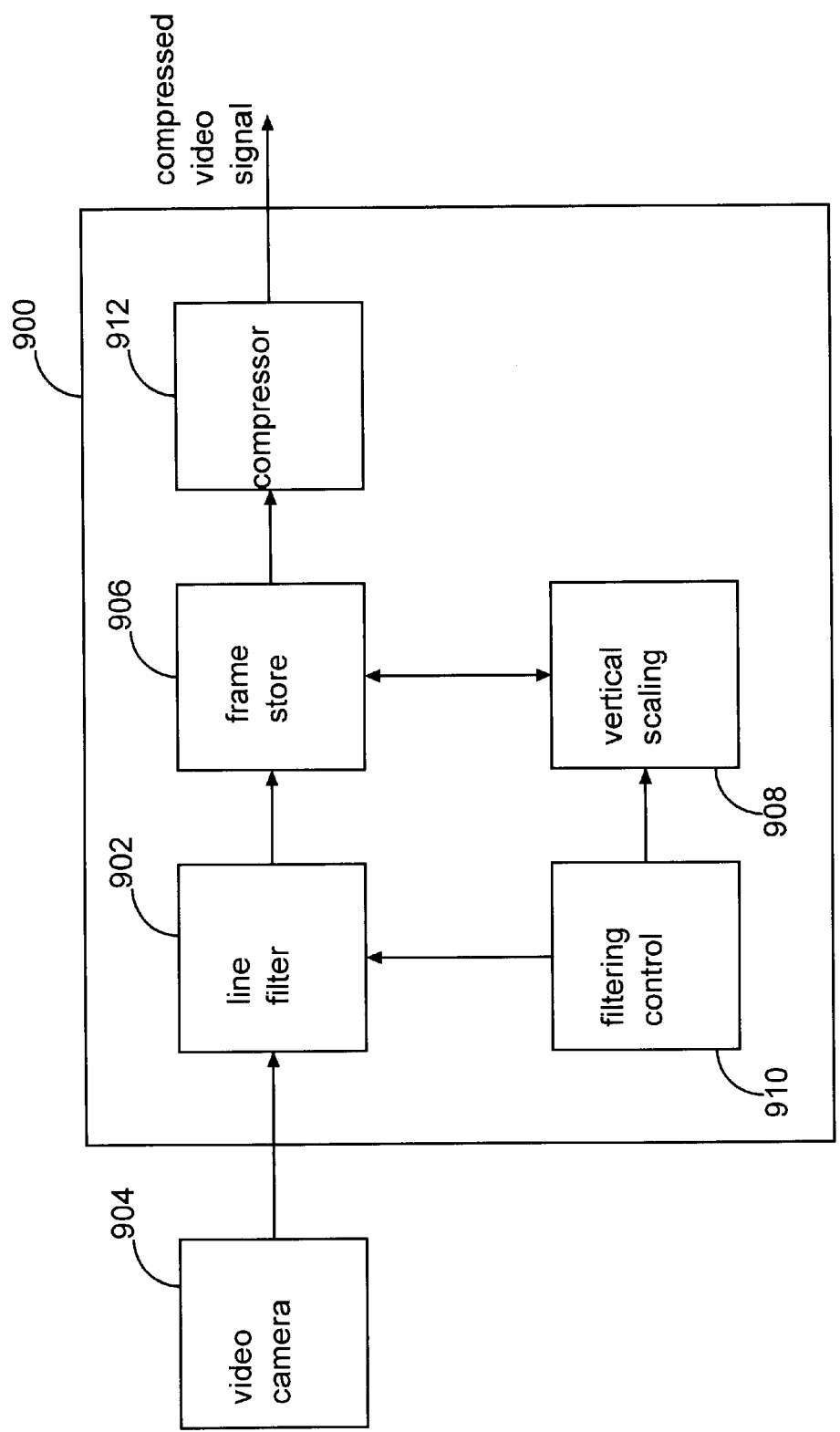
FIG. 9 is a block diagram of an example arrangement for controlling signal filtering, according to another embodiment of the present invention.

Alternatively, the amount of preprocessing can be controlled externally, for example, using a video processor. FIG. 9 illustrates an example arrangement for using a video processor 900 to control the amount of filtering performed. A line filter 902 receives a digital video signal as input from a video camera 904 and performs horizontal scaling on the image represented by the signal. The line filter 902 provides the horizontally scaled image to a frame store 906, such as a buffer, which stores it. The frame store 906 exchanges the image with a vertical scaling block 908, which uses microcode to perform vertical scaling on the image. Both horizontal and vertical scaling are controlled by a filtering control block 910. Horizontal and vertical scaling can be performed, respectively, by camera control and digital signal processing portions of the video processor 900. The frame store 906 also provides the scaled image to a compressor 912, which compresses the scaled image and outputs it as a compressed video signal. For examples of filtering techniques, reference can be made to U.S. Pat. Nos. 5,379,351 and 5,594,813, issued respectively on Jan. 3, 1995 and Jan. 14, 1997 to Fandrianto et al. and incorporated herein by reference.

Figure 10:
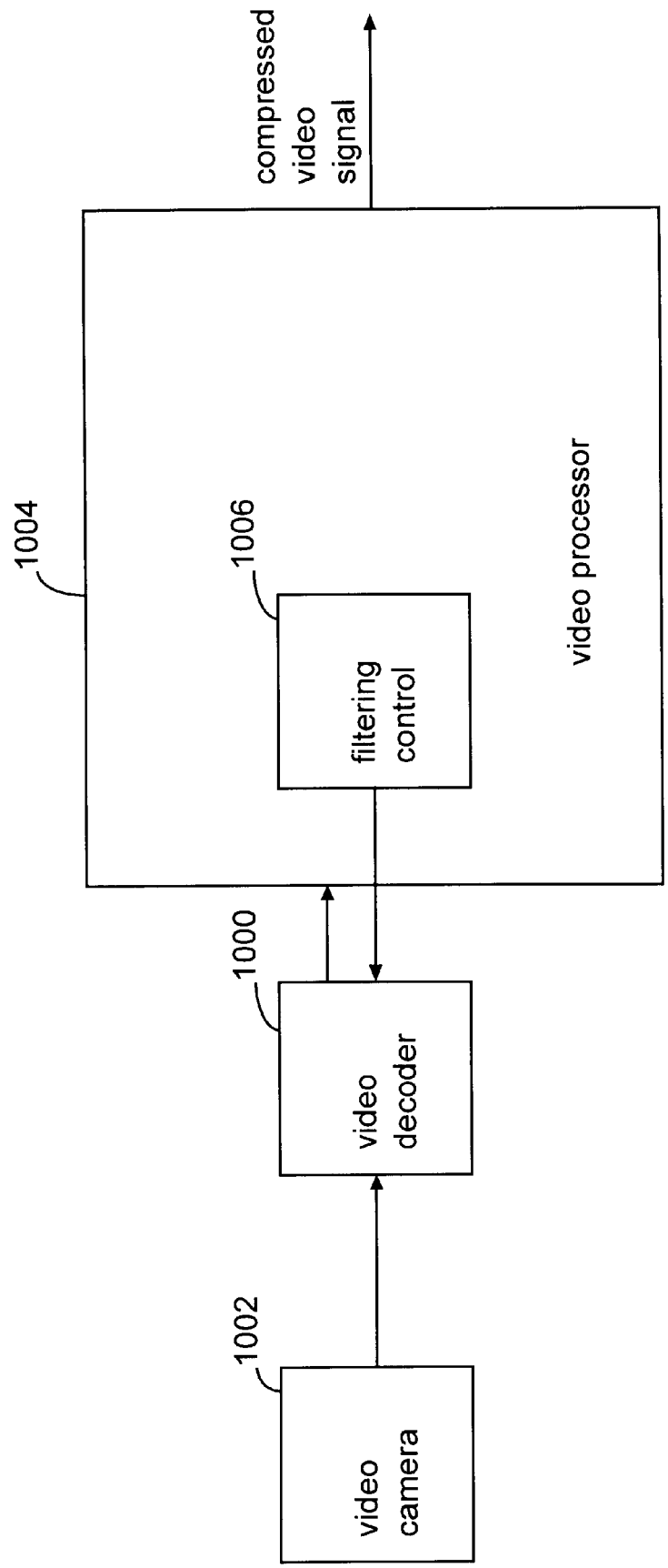
FIG. 10 is a block diagram of an example arrangement for filtering a video signal, according to another embodiment of the present invention.

FIG. 10 illustrates an example arrangement for using a video decoder 1000 to perform both horizontal and vertical scaling on an analog video signal received from a video camera 1002. The video decoder 1000 can be implemented using, for example, a Bt829A-, Bt827A-, or Bt825A-type video decoder, commercially available from the Brooktree Division of Rockwell Semiconductor Systems, Inc., of San Diego, Calif. Information on these video decoder types is attached hereto as Appendix A. The video decoder 1000 codes the analog video signal as a digital video signal, which it provides to a video processor 1004. The video processor 1004 includes a filtering control block 1006 that provides a filtering control signal to the video decoder 1000. The video decoder 1000 adjusts the amount of filtering it performs based on the filtering control signal. The video processor 1004 compresses the digital video signal and outputs a compressed video signal.

Figure 11:
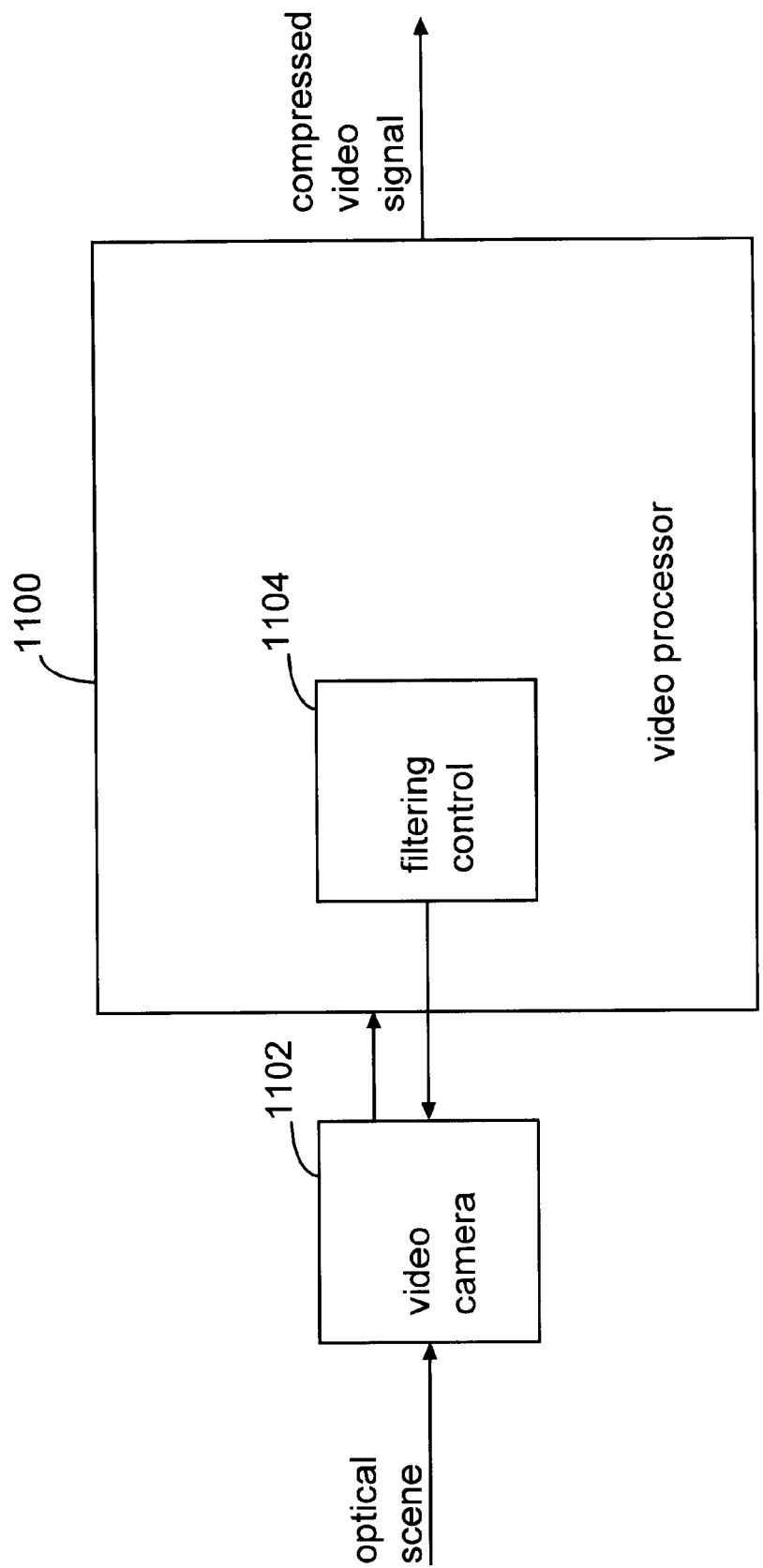
FIG. 11 is a block diagram of an example arrangement for controlling signal filtering, according to still another embodiment of the present invention.

FIG. 11 depicts an example arrangement for using a video processor 1100 to control filtering performed by a video camera 1102. The video camera 1102 captures and performs spatial filtering on an image. The video camera 1102 provides a digital video signal to the video processor 1100. The video processor 1100 includes a filtering control block 1104, which provides a filtering control signal to the video camera 1102. The video camera 1102 adjusts the filtering performed on the scene in response to the filtering control signal. The video processor 1100 compresses the filtered digital video signal and outputs a compressed video signal.

Figure 12:
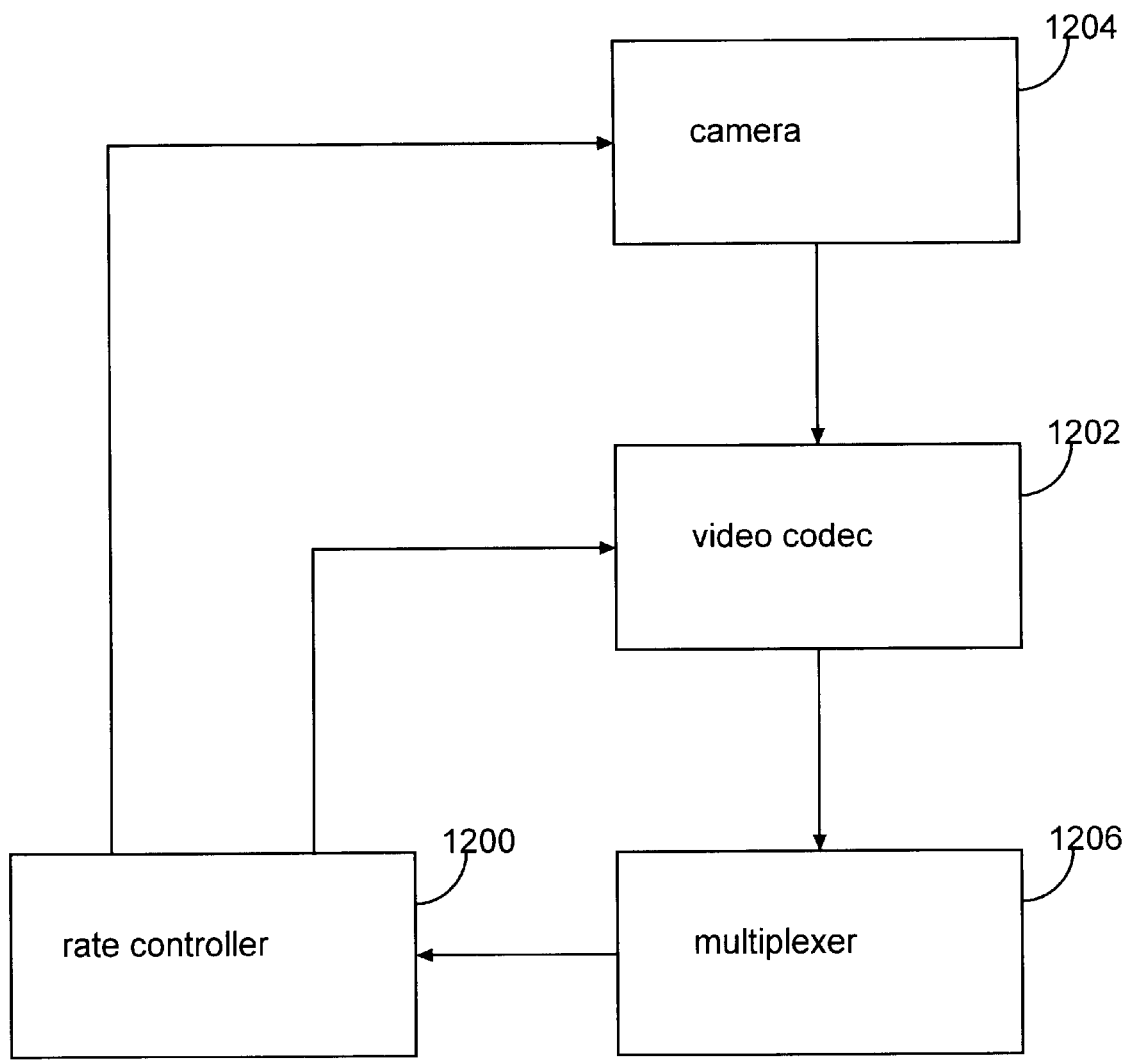
FIG. 12 is a block diagram of an example arrangement for controlling a coding/decoding arrangement and a video camera, according to yet another embodiment of the present invention.

FIG. 12 depicts an example arrangement for using a rate controller 1200 to control a video codec 1202 and a video camera 1204. The rate controller 1200 receives input from a multiplexer 1206 indicating, for example, the bandwidth available for video. Based on this information, the rate controller 1200 adjusts the filtering performed by the video camera 1204 and/or the encoding performed by the video codec 1202.

To facilitate compression of a video signal, the video camera can be slightly defocused. The amount of defocusing and filtering can be controlled based on the amount of motion present in the scene. For example, if the scene is still or nearly still, little or no defocusing may be involved. More specifically, since there can be very little bandwidth available to send video, the transmitted image can be blurry. By defocusing the camera, the image is smoothed. This makes it easier to compress, and requires less bandwidth. Since the transmitted image would have had artifacts anyway, slightly defocusing the camera does not impair the processing.

Figure 13:
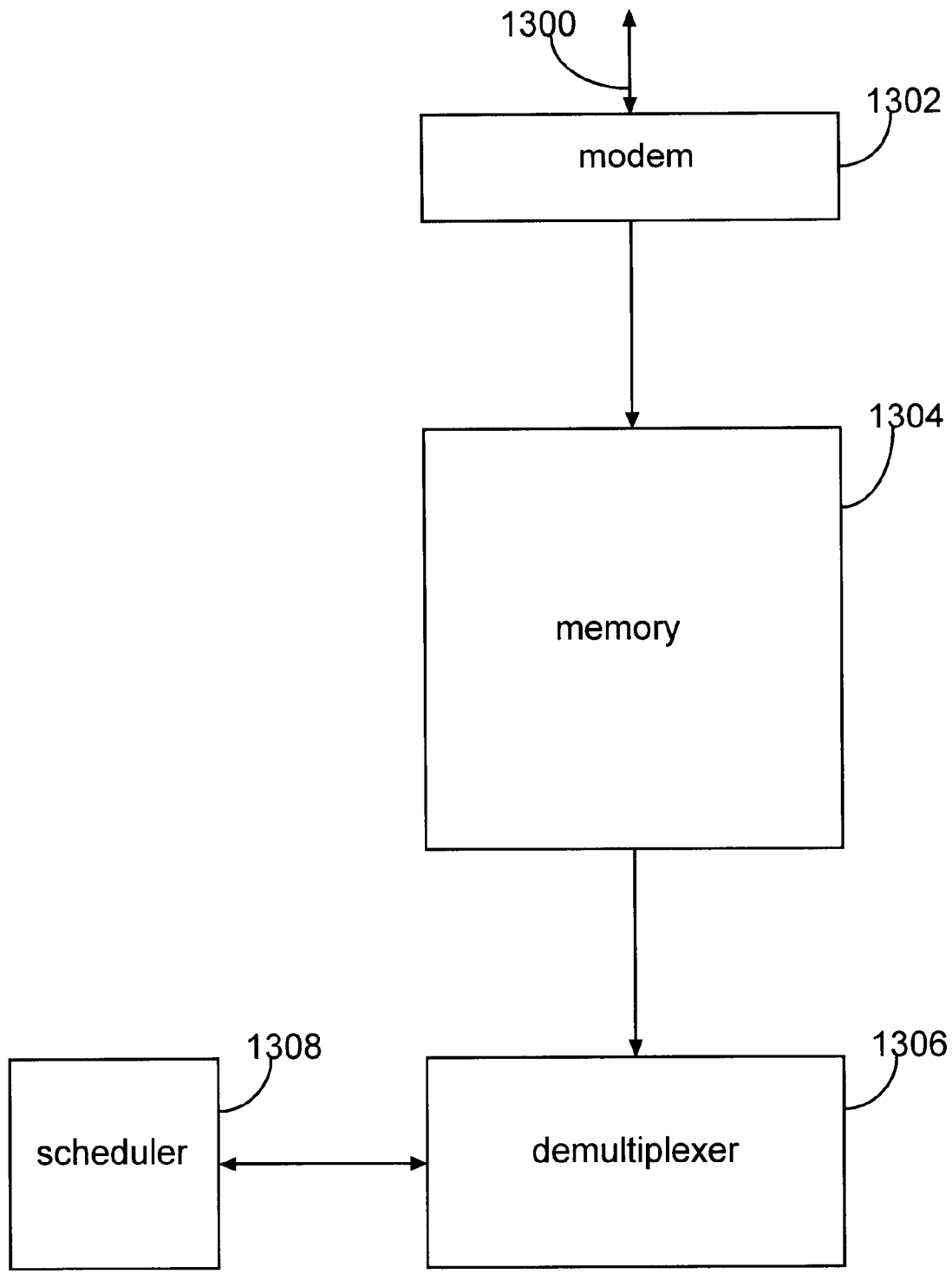
FIG. 13 is a block diagram of an example arrangement for controlling timing of delivery of audio data, according to an embodiment of the present invention.

Delivering a packet of audio data from one terminal to another typically involves a delay or latency period attributable to processes such as digitizing, compression, decompression, transmission and digital-to-analog conversion. This latency period is typically approximately 200 msec. And, in certain commercial embodiments, is believed to be as high as 500 msec. According to a particular embodiment of the present invention illustrated in FIG. 13, a receiving terminal reduces the latency period by selectively adjusting the intervals at which it decodes packets of audio data. The receiving terminal includes a modem 1300, which receives data from a communication channel 1302. The received data is stored in a memory 1304, such as a FIFO buffer. The scheduler calls the demultiplexer 1306 to sample and decode audio data packets at certain intervals. These packets are ideally transmitted at 30 msec. intervals. Accordingly, the scheduler ordinarily calls the demultiplexer at 30 msec. intervals. When the packets arrive at intervals of nearly 30 msec., they are decoded substantially immediately after their arrival.

Delays can result between the audio packet arriving in the memory 1304 and the operations by the demultiplexer 1306 and an audio decoder 1307. To reduce this delay, the demultiplexer 1306 monitors the delay and expedites processing of the audio packet. For example, if the memory 1304 is implemented using a FIFO buffer, these periods can be inferred from the number of bytes between the end of the FIFO buffer and the audio data packet. A relatively large number of bytes indicates that other types of data were stored in the memory 1304 and that the audio data packet stored had been resident in memory for a significant amount of time. On the other hand, a relatively small number of bytes suggests that the audio data packet had been stored in memory 1304 recently. The demultiplexer 1306 schedules this processing using a scheduling block 1308 with an indication of the number of bytes needed to read the audio data packet.

If the number of bytes suggests that the audio data packet had been resident in the memory 1304 for a significant amount of time, the scheduling block 1308 sends a control signal to the demultiplexer 1306 to reschedule the next call of the routine used to sample and decode audio data packets via the audio decoder 1307. For example, the demultiplexer 1306 might call the routine 25 msec after the previous call. This rescheduling potentially reduces the period during which audio data packets reside in the memory 1304 and can reduce the latency period from approximately 200 msec to approximately 160 msec.

While the disclosed embodiments have been presented as representative implementations, other embodiments of the present invention will be apparent to those skilled in the art from consideration of the overall specification and practice of the invention disclosed herein. It is intended that the specification and examples be considered as exemplary only, with a true scope and spirit of the invention being indicated by the following claims.

What is claimed is:

1. A multimedia communication arrangement for transmitting video and other signal types for communication over a communication channel having an indication of an available bandwidth, comprising:
   a first data source including a video image processor constructed to capture images and to present the images as a first type of data at a rate that varies in response to an available bandwidth factor for the communication channel;
   at least one additional data source generating at least one additional data signal; and
   a data signal processing circuit configured and arranged to collect the first type of data from the first data source at a rate that varies in response to the available channel bandwidth, to collect at least one additional type of data from the at least one additional data source at at least one established rate, and to adjust a rate at which the data collected from at least one of the first and the at least one additional data sources is transmitted in response to a detected error rate.

2. A multimedia communication arrangement, according to claim 1, wherein the data signal processing circuit comprises a multiplexer configured and arranged to detect the error rate.

3. A multimedia communication arrangement, according to claim 1, wherein the error rate is provided externally at least in part, either over the communication channel or by another communication path, and received by the data signal processing circuit.

4. A multimedia communication arrangement, according to claim 1, wherein the data signal processing circuit comprises a multiplexer configured and arranged to detect the error rate by detecting requests for retransmission of data.

5. A multimedia communication arrangement, according to claim 1, wherein the first type of data is presented as one or more data packets, wherein the data signal processing circuit comprises a prediction filter configured and arranged to generate a control signal for adjusting a size of the data packets in response to the detected error rate.

6. A multimedia communication arrangement, according to claim 5, wherein the prediction filter is configured and arranged to provide the control signal to the modem for controlling a transmission rate of the modem.

7. A multimedia communication arrangement, according to claim 1, wherein the data signal processing circuit is further configured and arranged to adjust filtering performed by a video camera.

8. A multimedia communication arrangement, according to claim 1, further comprising a data recovery terminal configured and arranged to selectively adjust an interval at which received audio data is processed.

9. A multimedia communication arrangement, according to claim 1, wherein the data signal processing circuit is further configured and arranged to adjust filtering performed by a video camera, and further comprising a data recovery terminal configured and arranged to selectively adjust an interval at which received audio data is processed.

10. A multimedia communication arrangement for transmitting video and other signal types for communication over a communication channel having an indication of an available bandwidth, comprising:
    a first data source including a video image processor constructed to capture images from a video camera and to present the images as a first type of data at a rate that varies in response to an available bandwidth factor for the communication channel;
    at least one additional data source generating at least one additional data signal; and
    a data signal processing circuit configured and arranged to collect the first type of data from the first data source at a rate that varies in response to the available channel bandwidth, to collect at least one additional type of data from the at least one additional data source at at least one established rate, and to adjust filtering performed by the video camera.

11. A multimedia communication arrangement, according to claim 10, wherein the data signal processing circuit is configured and arranged to adjust the amount of filtering performed by the video camera by providing a control signal to the video camera.

12. A multimedia communication arrangement, according to claim 10, wherein the data signal processing circuit is configured and arranged to adjust filtering performed by the video camera by using a video processor.

13. A multimedia communication arrangement, according to claim 12, wherein the video processor comprises a line filter for filtering the images with respect to a first direction.

14. A multimedia communication arrangement, according to claim 13, wherein the video processor further comprises a filter block for filtering the images with respect to a second direction.

15. A multimedia communication arrangement, according to claim 14, further comprising a compressor configured and arranged to compress the filtered images.

16. A multimedia communication arrangement, according to claim 10, wherein the data signal processing circuit is configured and arranged to adjust the amount of filtering performed by the video camera by using a video decoder.

17. A multimedia communication arrangement, according to claim 10, wherein the video decoder comprises a filtering control block configured and arranged to provide a control signal to the data signal processing circuit.

18. A multimedia communication arrangement, according to claim 10, wherein the data signal processing circuit is configured and arranged to adjust the amount of filtering performed by the video camera by using a rate controller configured and arranged to provide a control signal to at least one of the video camera and the data signal processing circuit.

19. A multimedia communication arrangement, according to claim 18, wherein the rate controller is configured and arranged to generate the control signal based on a level of motion in at least some of the captured images.

20. A multimedia communication arrangement, according to claim 10, wherein the data signal processing circuit is further configured and arranged to defocus the video camera to an extent determined at least in part as a function of the level of motion.

21. A multimedia communication arrangement, according to claim 10, wherein the data signal processing circuit is further configured and arranged to adjust a rate at which the collected data is transmitted in response to a detected error rate.

22. A multimedia communication arrangement, according to claim 10, further comprising a data recovery terminal configured and arranged to selectively adjust an interval at which received audio data is processed.

23. A multimedia communication arrangement, according to claim 10, wherein the data signal processing circuit is further configured and arranged to adjust a rate at which the collected data is transmitted in response to a detected error rate, and further comprising a data recovery terminal configured and arranged to selectively adjust an interval at which received audio data is processed.

24. For use in a multimedia communication arrangement for transmitting video and other signal types for transmission over a communication channel having an indication of an available bandwidth, a data recovery arrangement comprising:

a memory configured and arranged to store data received from the communication channel; and a data signal processing circuit responsive to the memory and configured and arranged to sample audio data from the memory at selectively adjustable intervals.

25. A data recovery arrangement, according to claim 24, wherein the data signal processing circuit is configured and arranged to monitor a time period during which audio data had been resident in the memory before being sampled.

26. A data recovery arrangement, according to claim 25, wherein at least one of the intervals is adjusted in response to the time period being relatively long.

27. A data recovery arrangement, according to claim 25, further comprising a scheduling block responsive to the data signal processing arrangement and configured and arranged to adjust at least one of the intervals in response to the time period being relatively long.

28. A data recovery arrangement, according to claim 24, wherein the data signal processing arrangement is configured and arranged to monitor a quantity of shifts performed in connection with sampling the audio data from the memory.

29. A data recovery arrangement, according to claim 28, wherein at least one of the intervals is adjusted in response to the quantity of shifts being relatively low.

30. A data recovery arrangement, according to claim 28, further comprising a scheduling block responsive to the data signal processing arrangement and configured and arranged to adjust at least one of the intervals in response to the quantity of shifts being relatively low.

31. A method for formatting multiple types of data, including data representing images, for transmission over a communication channel having an indication of an available bandwidth, the method comprising:

presenting captured images as a first type of data at a rate that varies in response to an available bandwidth factor for the communication channel;

generating at least one additional type of data;

collecting the first type of data at a rate that varies in response to the available channel bandwidth;

collecting the at least one additional type of data at at least one established rate; and adjusting a rate at which the data collected from at least one of the first and the at least one additional data sources is transmitted in response to a detected error rate.

32. A method, according to claim 31, further comprising receiving the error rate.

33. A method, according to claim 31, further comprising using a multiplexer to detect the error rate.

34. A method, according to claim 33, further comprising using the multiplexer to detect requests for retransmission of data.

35. A method, according to claim 31, further comprising:

presenting the first types of data as one or more data packets;

using a prediction filter to generate a control signal based on the detected error rate; and in response to the control signal, adjusting a size of the data packets based on the detected error rate.

36. A method, according to claim 35, further comprising using the control signal to adjust the rate at which the collected data is transmitted.

37. A method, according to claim 31, further comprising adjusting filtering performed by a video camera.

38. A method for formatting multiple types of data, including data representing images, for transmission over a communication channel having an indication of an available bandwidth, the method comprising:

presenting images captured using a video camera as a first type of data at a rate that varies in response to an available bandwidth factor for the communication channel;

generating at least one additional type of data;

collecting the first type of data at a rate that varies in response to the available channel bandwidth;

collecting the at least one additional type of data at at least one established rate; and adjusting filtering performed by the video camera.

39. A method, according to claim 38, further comprising providing a control signal to the video camera for adjusting the filtering performed by the video camera.

40. A method, according to claim 38, further comprising using a video processor to adjust the filtering performed by the video camera.

41. A method, according to claim 38, further comprising using a line filter to filter the images with respect to a first direction.

42. A method, according to claim 39, further comprising using a filter block to filter the images with respect to a second direction.

43. A method, according to claim 42, further comprising using a compressor to compress the filtered images.

44. A method, according to claim 38, further comprising using a video decoder to adjust the filtering performed by the video camera.

45. A method, according to claim 38, further comprising using at least one of a filtering control block and a rate controller to provide a control signal to at least one of the video camera and the data signal processing circuit.

46. A method, according to claim 45, further comprising generating the control signal based at least in part on a level of motion in at least some of the captured images.

47. A method, according to claim 46, further comprising defocusing the video camera to an extent determined at least in part as a function of the level of motion.

48. A method, according to claim 38, further comprising adjusting a rate at which the collected data is transmitted in response to a detected error rate.

49. A method for recovering data transmitted over a communication channel, comprising:

storing data received from the communication channel in a memory; and using a data signal processing circuit to sample audio data from the memory at selectively adjustable intervals.

50. A method, according to claim 49, further comprising monitoring a time period during which audio data had been resident in the memory before being decoded.

51. A method, according to claim 50, further comprising scheduling a decode operation in response to the time period the date has been resident in memory.

52. A method, according to claim 50, further comprising monitoring a quantity of shifts performed in connection with sampling the audio data from the memory.

53. A method, according to claim 52, further comprising adjusting at least one of the intervals in response to the quantity of shifts being relatively low.

54. An arrangement for formatting multiple types of data, including data representing images, for transmission over a communication channel having an indication of an available channel bandwidth, the system comprising:

means for presenting captured images as a first type of data at a rate that varies in response to an available bandwidth factor for the communication channel;

means for generating at least one additional type of data;

means for collecting the first type of data at a rate that varies in response to the available channel bandwidth;

means for collecting at least one additional type of data at at least one established rate; and means for adjusting a rate at which the data collected from at least one of the first and the at least one additional data sources is transmitted in response to a detected error rate.

55. An arrangement for formatting multiple types of data, including data representing images, for transmission over a communication channel having an indication of an available channel bandwidth, the system comprising:

means for presenting images captured using a video camera as a first type of data at a rate that varies in response to an available bandwidth factor for the communication channel;

means for generating at least one additional type of data;

means for collecting the first type of data at a rate that varies in response to the available channel bandwidth;

means for collecting the at least one additional type of data at at least one established rate; and means for adjusting filtering performed by the video camera.

56. A data recovery arrangement for recovering data transmitted over a communication channel, comprising:

means for storing data received from the communication channel in a memory; and means for using a data signal processing circuit to sample audio data from the memory at selectively adjustable intervals.

57. The multimedia communication arrangement of claim 1, wherein the data signal processing circuit is further configured and arranged to receive the error rate over the communication channel.

58. The multimedia communication arrangement of claim 1, wherein the data signal processing circuit is further configured and arranged to detect error rate as a function of requests for retransmissions over the communication channel.

59. The method of claim 31, further including receiving the error rate over the communication channel.

60. The method of claim 31, further including detecting the error rate as a function of requests for retransmissions over the communication channel.

\* \* \* \* \*

UNITED STATES PATENT AND TRADEMARK OFFICE
CERTIFICATE OF CORRECTION

PATENT NO. : 6,404,776 B1  Page 1 of 1
DATED : June 11, 2002
INVENTOR(S) : Voois et al.

It is certified that error appears in the above-identified patent and that said Letters Patent is hereby corrected as shown below:

Column 9,
Lines 25, 28, 30, 31, 33 and 52, "$t_k$" should read -- $\underline{t}_k$ -- in all instances.
The equation at line 50, should read -- $\underline{t}_k = \alpha \underline{t}_k + (1-\alpha)t_k$ --.

Column 11,
Lines 39, 41, 48, 49(2), 52 and 54, "$t_k$" should read -- $\underline{t}_k$ -- in all instances.

Column 18,
Line 22, please replace the number "1300" with -- 1302 --.
Line 23, please replace the number "1302" with --1300 --.
Line 34, please delete "and an audio decoder 1307".
Line 54, please delete "via the audio decoder 1307".

Signed and Sealed this

Twenty-ninth Day of October, 2002

Attest:

Attesting Officer

JAMES E. ROGAN
Director of the United States Patent and Trademark Office